US011877168B2

(12) United States Patent
Takeuchi et al.

(10) Patent No.: US 11,877,168 B2
(45) Date of Patent: Jan. 16, 2024

(54) RADIO FRAME ANALYSIS SYSTEM, RADIO FRAME ANALYSIS METHOD, AND PROGRAM

(71) Applicant: NEC Corporation, Tokyo (JP)

(72) Inventors: Toshiki Takeuchi, Tokyo (JP); Kohei Okada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 258 days.

(21) Appl. No.: 17/512,821

(22) Filed: Oct. 28, 2021

(65) Prior Publication Data

US 2022/0141688 A1 May 5, 2022

(30) Foreign Application Priority Data

Nov. 4, 2020 (JP) ................................ 2020-184239

(51) Int. Cl.
*H04W 24/08* (2009.01)
*H04W 40/24* (2009.01)

(52) U.S. Cl.
CPC ......... *H04W 24/08* (2013.01); *H04W 40/246* (2013.01)

(58) Field of Classification Search
CPC ............................ H04W 24/08; H04W 40/246
See application file for complete search history.

(56) References Cited

U.S. PATENT DOCUMENTS

| | | | | |
|---|---|---|---|---|
| 10,341,978 | B2 * | 7/2019 | Kami | H04W 64/00 |
| 11,009,583 | B1 * | 5/2021 | Michaelis | G06N 20/00 |
| 2008/0014884 | A1 * | 1/2008 | Oyman | H04B 7/0452 455/187.1 |
| 2014/0171126 | A1 * | 6/2014 | Mayor | G01S 5/14 455/456.6 |

FOREIGN PATENT DOCUMENTS

| | | |
|---|---|---|
| JP | 2004-248083 | 9/2004 |
| JP | 2008-510372 A | 4/2008 |

* cited by examiner

*Primary Examiner* — Hassan Kizou
*Assistant Examiner* — Hector Reyes
(74) *Attorney, Agent, or Firm* — Sughrue Mion, PLLC

(57) ABSTRACT

A radio frame analysis system includes: an analysis unit that analyzes a network configuration by performing clustering processing on a frame feature value; a distance calculation unit that calculates a distance between clusters obtained by the clustering processing; a reliability determination unit that determines reliability of a result of the clustering processing based on the distance between the clusters; an output unit that outputs a result of the analysis performed by the analysis unit; and an output timing change unit that changes a timing at which the output unit outputs the result of the analysis by changing the number of samples of the frame feature value required to output the result in accordance with the reliability.

10 Claims, 16 Drawing Sheets

Case 1

DISTANCE BETWEEN CLUSTERS (CIRCLES OF 2$\sigma$) IS STILL SHORT⟶DO NOT OUTPUT RESULT IMMEDIATELY Case 2

DISTANCE BETWEEN CLUSTERS (CIRCLES OF 2$\sigma$) IS LONG→
DETERMINE RELIABILITY IS HIGH AND OUTPUT RESULT
(ADAPTIVELY INCREASE SPEED)

| | CLUSTER 1 | CLUSTER 2 | CLUSTER 3 | ・・・ | CLUSTER n | RELIABILITY |
|---|---|---|---|---|---|---|
| CLUSTER 1 | FEATURES OF CLUSTER 1 (AVERAGE, VARIANCE, ETC.) | DISTANCE TO CLUSTER 2 | DISTANCE TO CLUSTER 3 | ・・・ | DISTANCE TO CLUSTER n | RELIABILITY OF CLUSTER 1 |
| CLUSTER 2 | DISTANCE TO CLUSTER 1 | FEATURES OF CLUSTER 2 (AVERAGE, VARIANCE, ETC.) | DISTANCE TO CLUSTER 3 | ・・・ | DISTANCE TO CLUSTER n | RELIABILITY OF CLUSTER 2 |
| CLUSTER 3 | DISTANCE TO CLUSTER 1 | DISTANCE TO CLUSTER 2 | FEATURES OF CLUSTER 3 (AVERAGE, VARIANCE, ETC.) | ・・・ | DISTANCE TO CLUSTER n | RELIABILITY OF CLUSTER 3 |
| ・・・ | ・・・ | ・・・ | ・・・ | ・・・ | ・・・ | ・・・ |
| CLUSTER n | DISTANCE TO CLUSTER 1 | DISTANCE TO CLUSTER 2 | DISTANCE TO CLUSTER 3 | ・・・ | FEATURES OF CLUSTER n (AVERAGE, VARIANCE, ETC.) | RELIABILITY OF CLUSTER n |

Fig. 10

RADIO FRAME ANALYSIS SYSTEM, RADIO FRAME ANALYSIS METHOD, AND PROGRAM

INCORPORATION BY REFERENCE

This application is based upon and claims the benefit of priority from Japanese patent application No. 2020-184239, filed on Nov. 4, 2020, the disclosure of which is incorporated herein in its entirety by reference.

TECHNICAL FIELD

The present disclosure relates to a radio frame analysis system, a radio frame analysis method, and a program for analyzing a configuration of a network to be analyzed by analyzing a radio frame. In particular, the present disclosure relates to control of an output when a configuration of a network is analyzed by analyzing a radio frame.

BACKGROUND ART

A system that analyzes a radio frame and/or traffic of a target terminal by using a radio-wave sensor, a traffic monitor, and/or the like, and thereby infers the transmitted contents (i.e., transmitted information and the like) and/or infers the configuration of a network to be analyzed has been proposed. Hereinafter, the network to be analyzed is also referred to as the target network. Note that examples of the transmitted contents include a voice call, transmission of a video image, a videophone, broadcasting, television broadcasting, satellite broadcasting, the radio, an SMS (Short Message Service), Web access, an SNS (Social Networking Service) application, use of a carrier-specific function such as iMode, a smartphone application, telemetry, a video game, an FTP (File Transfer Protocol), an SSH (Secure Shell), a Telnet, and an RDP (Remote Desktop Protocol). Further, examples of the configuration of a network include a tree type, a star type, a ring type, a mesh type, a bus type, a full connect type, and a combination thereof.

As a method for analyzing a radio frame and/or traffic, a method for extracting and analyzing a frame feature value such as an amount of transfer data per certain unit time, the number of transfer data, the number of times of transfers, a frequency of transfers (i.e., a frequency of occurrences of transfers), and a transfer time has been proposed.

Published Japanese Translation of PCT International Publication for Patent Application, No. 2008-510372 proposes a method for extracting an amount of data and/or an amount of consumed resources for each subscriber at certain time intervals and thereby settling a service charge for the subscriber. The resources available to each subscriber vary depending on various conditions including whether or not other users are using the resources. Therefore, in the method disclosed in the aforementioned document, the service charge is determined as a function of both the amount of consumed resources and the amount of transmitted data by extracting the amount of resources as well as the amount of data for each subscriber at certain time intervals, so that the reasonable settlement and collection of the service charge can be made. In this case, the certain time (the unit time) that serves as the basis for the period during which the amount of data and the amount of resources are extracted is fixedly set (e.g., per hour, per day, or per month) according to the time for which the settlement is made, so that the desired settlement fee can be calculated from the function of both of them. However, there is a problem that when the time for which the settlement is made is longer than necessary for these settings of the unit time, it takes more time than necessary to obtain a result of the calculation.

Further, Japanese Unexamined Patent Application Publication No. 2004-248083 proposes a method for enabling a user to recognize an error in accordance with the number of occurrences of various types of errors related to a network communication operation. This method enables a user to recognize only necessary errors with a high reliability by outputting to the user that, in regard to each of various types of errors related to a network communication operation, the error has occurred only when the counted number of successive occurrences reaches a set number. However, in this case, whether or not to output an error to a user is determined depending on the above-described set number of occurrences. Therefore, even if an important error with a higher reliability has occurred in the middle of the operation, information indicating that the error has occurred is not output to a user when the number of occurrences has not reached the set number of occurrences. That is, there is a problem that it takes more time than necessary to output an error.

SUMMARY

As a method for analyzing a radio frame and/or traffic, a method for extracting and analyzing a frame feature value such as an amount of transfer data per certain unit time, the number of transfer data, the number of times of transfers, a frequency of transfers, and a transfer time has been proposed. Here, in order to improve the accuracy of estimating a result of the analysis, it is preferable to perform the analysis using the number of samples of the frame feature values as large as possible. However, as the required number of samples increases, it takes time to obtain the required number of samples, and thus it takes a long time to output a result of the analysis. For this reason, when the required number of samples is fixed using an empirical or statistical method, there is a problem that it takes wasted time until a result is output although the accuracy of the estimation may be high even if the number of samples is actually smaller than the set number of samples.

As an example, assume a case in which an analysis is performed in order to determine which transmission node is the hub station of a star-type network based on the ratio among amounts of transmission data transmitted from respective transmission nodes per unit time. In this case, when the length of the unit packet, the time for changing users, the transmission data content, or the like are unknown, it is difficult to appropriately set the unit time for extracting the amount of transmission data of each transmission node, and to appropriately set the number of samples required to output a result of the analysis. That is, assume a case in which the required number of samples including a margin is fixed in accordance with a certain assumption or application; for example, a network is estimated from the number of samples acquired during a time of one minute set in consideration of the time until the communication becomes stable. In this case, when the target network matches the certain assumption or application, it is possible to obtain a necessary and sufficient result of the analysis by the analysis of the set required number of samples. On the other hand, when the target network does not match the certain assumption and application, when it is possible to clearly distinguish whether or not each node is a predetermined type (e.g., a hub station), or when the margins are too large, it may able to actually obtain a sufficient accuracy of the analysis even with a smaller number of samples than the set required number of samples. In such a case, it is a problem that it takes more time than necessary to output a result.

Therefore, an example object that an example embodiment disclosed herein is intended to achieve is, when a frame feature value is extracted and analyzed in an analysis of a radio frame or an analysis of traffic, to output a result of the analysis in an appropriate time in accordance with an object to be analyzed.

A radio frame analysis system according to a first example aspect includes:

an analysis unit configured to analyze a network configuration by performing clustering processing on a frame feature value;

a distance calculation unit configured to calculate a distance between clusters obtained by the clustering processing;

a reliability determination unit configured to determine reliability of a result of the clustering processing based on the distance between the clusters;

an output unit configured to output a result of the analysis performed by the analysis unit; and an output timing change unit configured to change a timing at which the output unit outputs the result of the analysis by changing the number of samples of the frame feature value required to output the result in accordance with the reliability.

A radio frame analysis method according to a second example aspect includes:

analyzing a network configuration by performing clustering processing on a frame feature value;

calculating a distance between clusters obtained by the clustering processing;

determining reliability of a result of the clustering processing based on the distance between the clusters; and changing a timing at which the result of the analysis is output by changing the number of samples of the frame feature value required to output the result in accordance with the reliability.

A program according to a third example aspect causes a computer to execute:

an analysis step of analyzing a network configuration by performing clustering processing on a frame feature value;

a distance calculation step of calculating a distance between clusters obtained by the clustering processing;

a reliability determination step of determining reliability of a result of the clustering processing based on the distance between the clusters;

an output step of outputting a result of the analysis; and an output timing change step of changing a timing at which the result of the analysis is output by changing the number of samples of the frame feature value required to output the result in accordance with the reliability.

BRIEF DESCRIPTION OF DRAWINGS

The above and other aspects, features and advantages of the present disclosure will become more apparent from the following description of certain example embodiments when taken in conjunction with the accompanying drawings, in which:

FIG. 10 is a diagram showing an example of detailed output information for each cluster;

EXAMPLE EMBODIMENT

Overview of Example Embodiment

Figure 1:
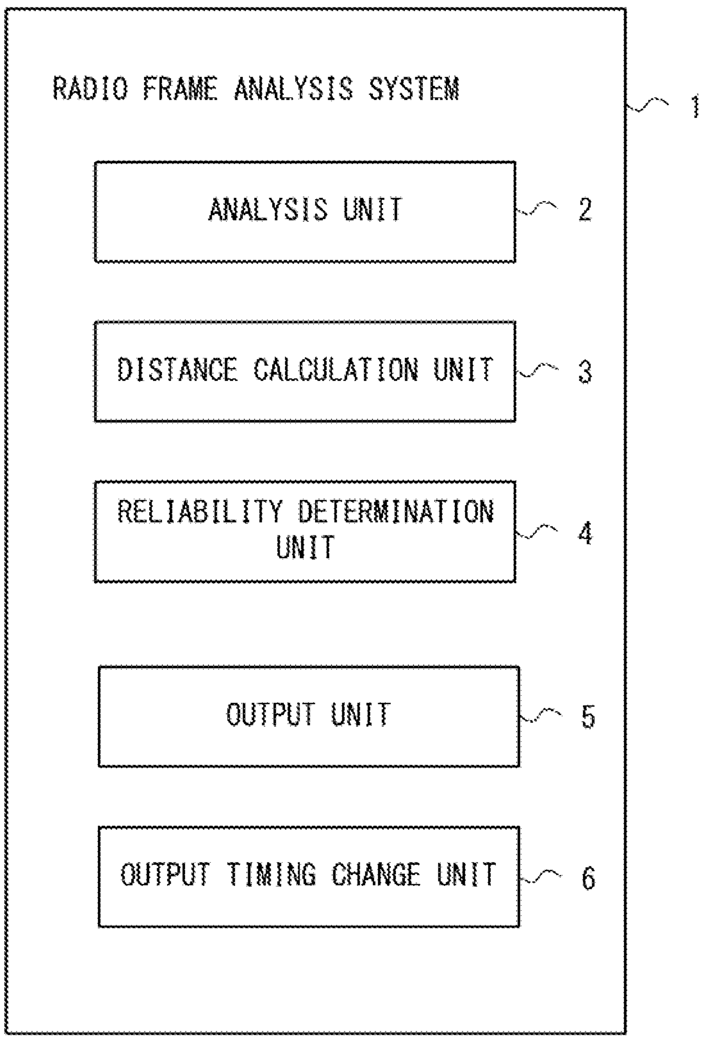
FIG. 1 is a block diagram of a radio frame analysis system according to an outline of an example embodiment.

Prior to describing an example embodiment, an overview of the example embodiment will be described. FIG. 1 is a block diagram showing an example of a configuration of a radio frame analysis system 1 according to an outline of an example embodiment. As shown in FIG. 1, the radio frame analysis system 1 includes an analysis unit 2, a distance calculation unit 3, a reliability determination unit 4, an output unit 5, and an output timing change unit 6.

The analysis unit 2 analyzes a network configuration by performing clustering processing on a frame feature value. The distance calculation unit 3 calculates a distance between clusters obtained by the clustering processing. The reliability determination unit 4 determines reliability of a result of the clustering processing based on the calculated distance between the clusters. The output unit 5 outputs a result of the analysis performed by the analysis unit 2. The output unit 5 may output information to, for example, a display or another terminal apparatus connected to the radio frame analysis system 1 so that it can communicate with the radio frame analysis system 1 wirelessly or by wire. Then the output timing change unit 6 changes a timing at which the output unit 5 outputs the result of the analysis by switching the number of samples of the frame feature value required to output the result in accordance with the determined reliability. Note that the frame feature value is a feature value representing an aspect of transmission performed by each transmission node. Examples of the frame feature value include an amount of transmission data, a frequency of transmission, the number of times of transmission, a transmission time, an occupancy rate, the number of transmission frames, a transmission band, the number of transmission data, a transmission modulation rate, and transmission power.

According to the radio frame analysis system 1 having the above-described configuration, it is possible to control the timing at which a result of the analysis is output in accordance with the reliability of the result of the clustering processing. That is, according to the radio frame analysis system 1, even if the number of samples of the frame feature value has not reached a predetermined required number, it is possible to output the result of the analysis when the determined reliability satisfies a criterion. Therefore, according to the radio frame analysis system 1, when the frame feature value is extracted and analyzed, it is possible to output the result of the analysis in an appropriate time in accordance with an object to be analyzed. That is, it is possible to adaptively reduce the time required to output the result.

Next, an example embodiment will be described in detail. In a first example embodiment, as an example of a radio frame analysis system, a basic configuration, features, and operations of a frame feature value extraction unit, an analysis unit, a sample number variable control unit, and the like will be described in detail. Note that the frame feature value extraction unit is a component that extracts an amount of transmission data and the like from a reception data sequence as a frame feature value, and the analysis unit is a component that performs clustering processing for analyzing a network configuration from the extracted frame feature value. Further, the sample number variable control unit is a component that controls the number of samples of the frame feature value required to output a result of the analysis. Further, in a second example embodiment, a description will be given of an example of a case in which a distance between clusters (i.e., reliability or similarity between clusters) is output together with a result of the analysis. Furthermore, in a third example embodiment, a description will be given of an example of a case in which a position and transmission power of each transmission node are estimated by using a plurality of radio-wave sensors and then a radio frame is analyzed.

<Description of Configuration>

Figure 2:
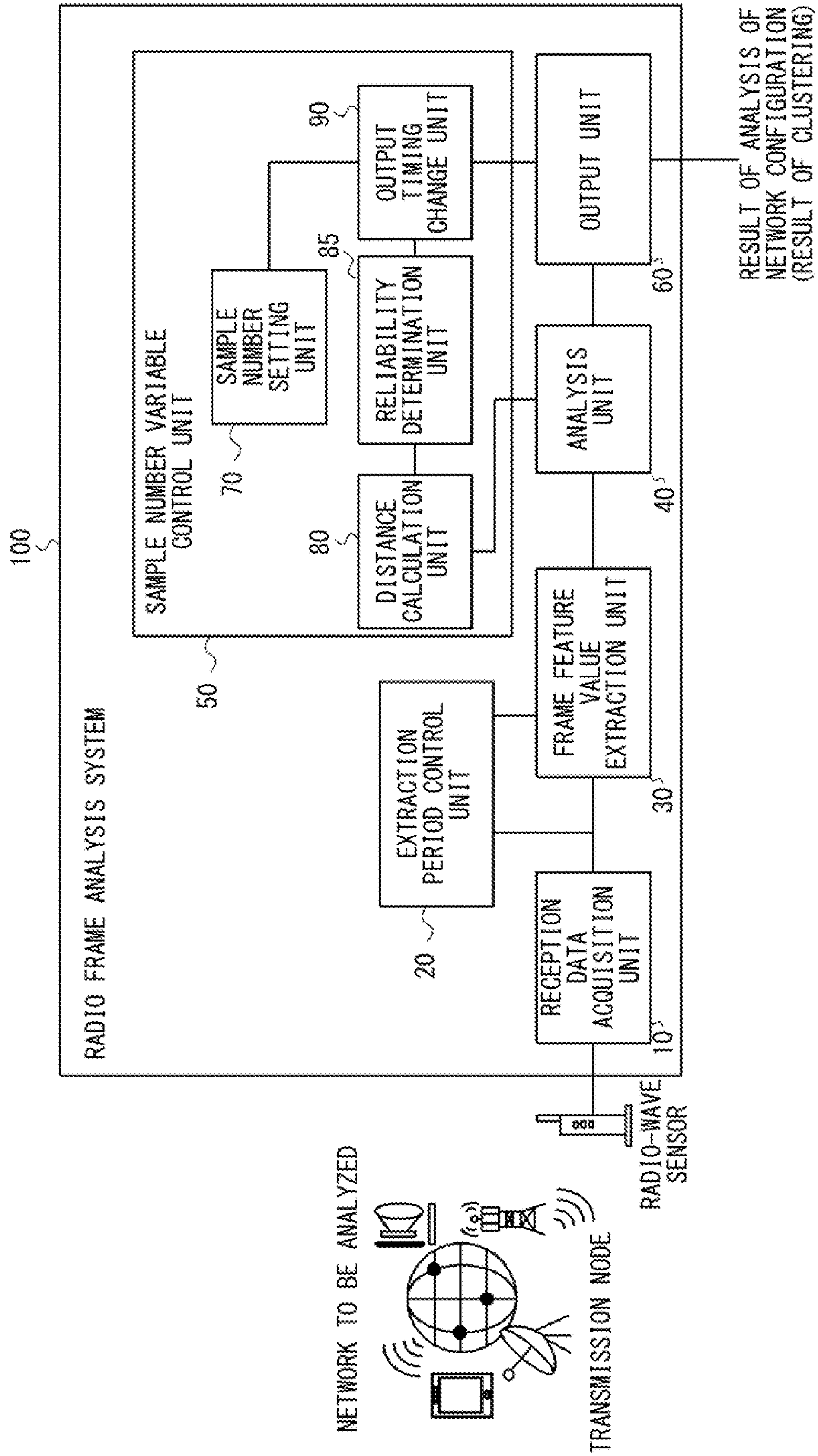
FIG. 2 is a diagram showing an overall configuration of a radio frame analysis system according to a first example embodiment.

FIG. 2 is a diagram showing an overall configuration of a radio frame analysis system according to the first example embodiment. As an example, this system includes a frame feature value extraction unit, an analysis unit, a sample number variable control unit, and the like. They will be described hereinafter in detail.

A radio frame analysis system 100 according to the first example embodiment includes a reception data acquisition unit 10, an extraction period control unit 20, a frame feature value extraction unit 30, an analysis unit 40, a sample number variable control unit 50, and an output unit 60. Here, the sample number variable control unit 50 includes a sample number setting unit 70, a distance calculation unit 80, a reliability determination unit 85, and an output timing change unit 90. Note that although not shown in the figure, the system may further include, behind (i.e., the output side of) the output unit 60, an analysis result visualization unit that visualizes, for a user, the configuration of the target network, features of each transmission node, and/or the like by using the result output from the output unit 60.

In this example embodiment, the analysis unit 40 corresponds to the analysis unit 2 shown in FIG. 1. The distance calculation unit 80 corresponds to the distance calculation unit 3 shown in FIG. 1. The reliability determination unit 85 corresponds to the reliability determination unit 4 shown in FIG. 1. The output unit 60 corresponds to the output unit 5 shown in FIG. 1. The output timing change unit 90 corresponds to the output timing change unit 6 shown in FIG. 1.

The reception data acquisition unit 10 acquires, from a reception data sequence acquired by using a radio-wave sensor or the like, for example, radio frame information (such as information about a strength of a radio wave, information about a frequency band, information about a frame length, information about a used protocol, information about a transmission source, information about transmission destination, and header information) of the acquired reception data sequence. Further, the frame feature value extraction unit 30 extracts a frame feature value (e.g., an amount of transmission data, the number of times of transmission, the transmission time, and the transmission power for each transmission node) from the radio frame information of the reception data sequence in accordance with the extraction period specified by the extraction period control unit 20. The extracted frame feature value is used as a sample to be subjected to clustering processing. The extraction period control unit 20 specifies an extraction period of the frame feature value. Therefore, the extraction period control unit 20 specifies an extraction period for obtaining one sample. For example, when the extraction period control unit 20 specifies a time T as the extraction period, the frame feature value extracted from the reception data sequence acquired during the time T constitutes one sample. The frame feature value extraction unit 30 repeats extraction of the frame feature value, that is, extraction of the sample. For example, the frame feature value extraction unit 30 extracts the frame feature value (i.e., the sample) each time the time T elapses. In this example embodiment, the extraction period control unit 20 specifies, for example, a predetermined fixed time as the extraction period.

The analysis unit 40 analyzes the network configuration by performing clustering processing on the extracted frame feature value. The analysis unit 40 analyzes, for example, which transmission node in the target network is a hub station (a control station, a root node, or the like) or a normal terminal station (a slave station). Specifically, for example, the analysis unit 40 first performs clustering processing on all the frame feature values (samples) obtained by the time when an analysis is started, and then specifies the cluster to which the largest number of samples for the transmission node of interest belong. By doing so, the analysis unit 40 determines that the node of interest is a node of a type corresponding to the feature of the specified cluster. For example, it is assumed that the frame feature value is the amount of transmission data, and the cluster to which the largest number of samples of the transmission node of interest belong is a cluster X. It is further assumed that the cluster X has a feature that the amount of transmission data is larger than that of another cluster. In this case, the analysis unit 40 determines that the transmission node of interest is a hub station (a control station, a root node, or the like). On the other hand, when the cluster to which the largest number of samples of the transmission node of interest belong is a cluster Y and the cluster Y has the feature that the amount of transmission data is smaller than that of another cluster, the analysis unit 40 determines that the transmission node of interest is a terminal station (a slave station).

The output unit 60 outputs a result of the analysis performed by the analysis unit 40 in accordance with an output timing specified by the sample number variable control unit 50.

Here, the sample number setting unit 70 included in the sample number variable control unit 50 sets a predetermined value as the required number of samples of the feature value. Here, the required number of samples of the feature value is the number of samples of the frame feature value required to output a result of the analysis performed by the analysis unit 40. Further, the distance calculation unit 80 calculates a distance between respective clusters from a result of the clustering in the analysis unit 40. The reliability determination unit 85 determines reliability of the result of the clustering in accordance with the calculated distance between the clusters. Then the output timing change unit 90 dynamically changes the number of samples of the frame feature value required to output the result of the analysis in accordance with the reliability determined by the reliability determination unit 85. Specifically, the output timing change unit 90 dynamically changes the number of samples of the frame feature value required to output the result of the analysis from a predetermined value set in advance by the sample number setting unit 70 to the number of samples obtained during the period before the timing at which the reliability is determined. By doing so, the output timing change unit 90 controls the timing at which the result is to be output (the number of samples of the feature value required to output the result).

<Description of Operation>

Figure 3:
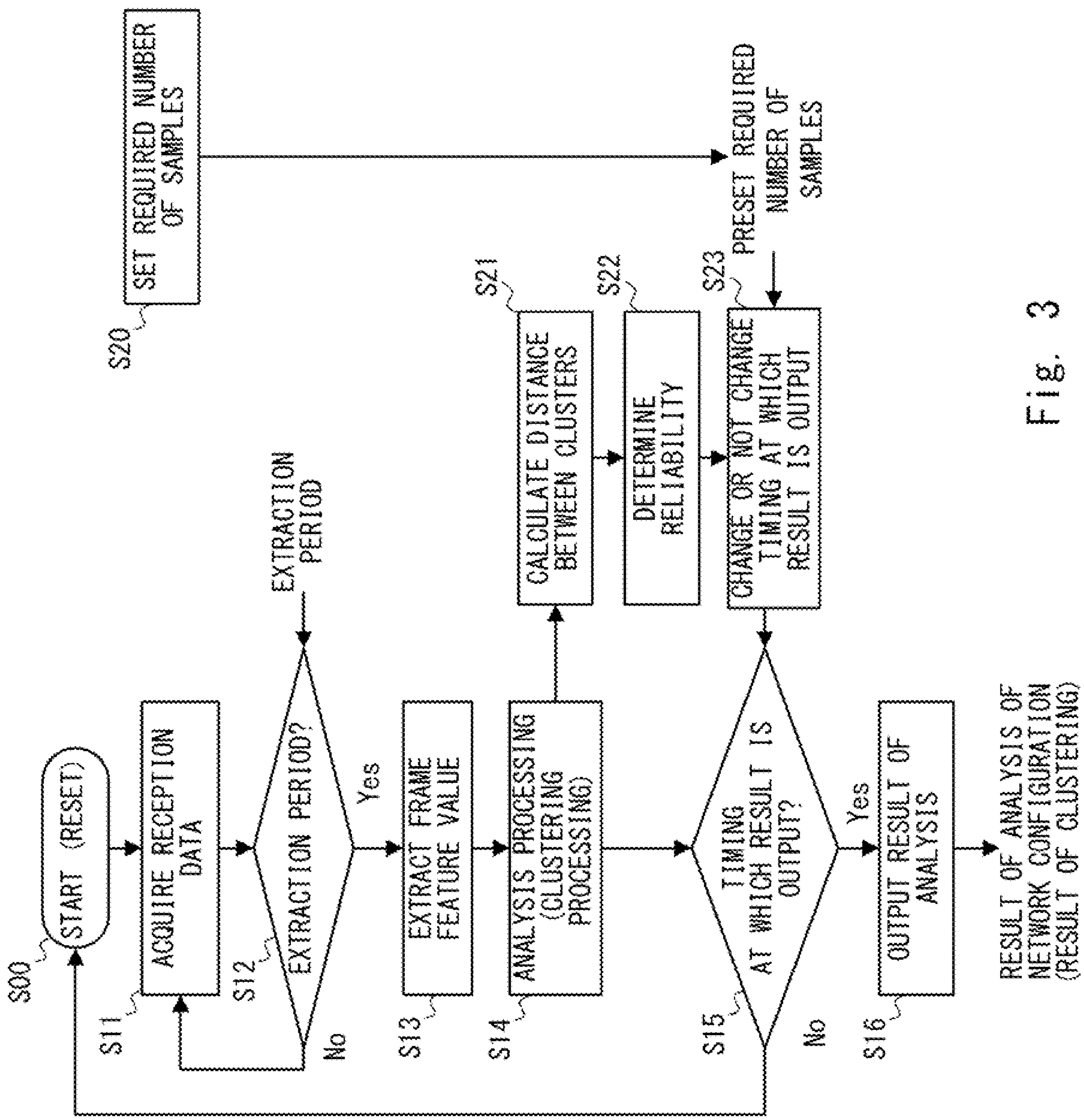
FIG. 3 is a diagram showing a flow of processes performed by the radio frame analysis system according to the first example embodiment.

Operations in the first example embodiment will be described with reference to FIGS. 3 to 6. FIG. 3 shows a flow of processes performed by the radio frame analysis system 100 according to the first example embodiment. In the operations in the first example embodiment, firstly, the reception data acquisition unit 10 acquires, from a reception data sequence acquired by using, for example, a radio-wave sensor or the like, radio frame information of the acquired reception data sequence (S11). Note that the reception data acquisition unit 10 continues acquiring the radio frame information until the extraction period notified from the extraction period control unit 20 has expired (S12). Then, when the time corresponding to the extraction period has expired, the frame feature value extraction unit 30 extracts a frame feature value such as an amount of transmission data from the radio frame information acquired during the extraction period (the reception data sequence acquired during the extraction period) (S13). Specifically, for example, the frame feature value extraction unit 30 counts the amount of transmission data transmitted from each transmission node during the extraction period and extracts the counted amount as a frame feature value for that transmission node. Note that examples of the frame feature value include, in addition to the amount of transmission data, feature values such as the frequency of transmission, the number of times of transmissions, a transmission time, an occupancy rate, the number of transmission frames, a transmission band, the number of transmission data, a transmission modulation rate, and transmission power.

Next, using the extracted frame feature value, the analysis unit 40 performs clustering processing for analyzing, for example, which transmission node in the target network is a hub station (a control station, a root node, or the like.) or an normal terminal station (a slave station) (S14). This clustering processing may be performed for each of a certain number of samples of the frame feature value. That is, the analysis unit 40 performs clustering processing each time a predetermined number of samples of the frame feature value are obtained. Then the frame feature value extraction unit 30 and the analysis unit 40 repeat the extraction of the frame feature value and the clustering processing until the number of samples to be subjected to the clustering processing reaches the required number of samples of the feature value notified from the sample number variable control unit 50 (S15). That is, the frame feature value extraction unit 30 and the analysis unit 40 repeat the extraction of the frame feature value and the clustering processing until the timing at which the result is output comes. If the number of samples to be subjected to the clustering processing reaches the required number of samples of the feature value, the output unit 60 outputs an result of the analysis (a result of the analysis of the network configuration, such as an analysis as to whether each transmission node is a hub station (a control station) or a terminal station) (S16).

Here, as described above, the sample number variable control unit 50 determines the timing at which the result is output (the required number of samples of the feature value).

First, the required number of samples of the feature value (S20) set in advance by the sample number setting unit 70 will be described. In general, the number of samples, which is determined experimentally or empirically in accordance with the configuration of the target network, the communication method, the content to be transmitted, the application thereof, and the like as the number of samples for which a result of the clustering having a reliability higher than a predetermined level can be obtained, is set in advance as the required number of samples of the feature value. For example, when the configuration of the network is analyzed from samples acquired in one minute, which is assumed to be a time required to make communication stable, it is conceivable to set the number of samples of the feature value that can be acquired in one minute as the required number of samples of the feature value. Note that the number of samples of the feature value that can be acquired in one minute is determined by dividing one minute by the extraction period specified by the extraction period control unit 20.

Alternatively, the required number of samples of the feature value may be set by statistically calculating the required number of samples of the feature value using statistics. When the required number of samples of the feature value is statistically calculated, the required number of samples of the feature value may be calculated, for example, from a statistical probability that a population including not only the extracted frame feature value but also the subsequent frame feature value falls within a cluster distribution constituted only by the extracted frame feature value. For example, assuming that the distribution of the frame feature value is in accordance with a normal distribution and assuming that the confidence coefficient is 95%, the number n of samples required to make an error in the accuracy of the estimation of a population proportion 5% or less can be calculated by the following Expression. Note that the following example is an example in which the accuracy of the estimation (the probability that the frame feature value of each transmission node is correctly classified into a cluster representing the feature of the transmission node) is set to 80%. Note that, in the following Expression, since the confidence coefficient is 95%, 1.96 is used as a value of the quantile point used in the calculation of the required number of samples of the feature value.

$$1.96 \times \sqrt{\frac{0.8 \times (1-0.8)}{n}} \leq 0.05 \quad \text{[Expression 1]}$$

When the above Expression is solved for n, a solution n≥245.9 can be obtained. That is, in this case, 246 may be set in the required number of samples of the feature value. Note that although a normal distribution is used in the above description, other distributions such as a t-distribution may instead be used. In this way, the sample number setting unit 70 may statistically determine the required number of samples of the feature value by using the confidence coefficient of the population proportion and the error in the accuracy of the estimation of the population proportion. Note that when a user does not need to set in advance the required number of samples of the feature value, that is, when the required number of samples of the feature value can be fixedly registered in the system, the sample number setting unit 70 may not be explicitly included in the system.

Figure 4A:
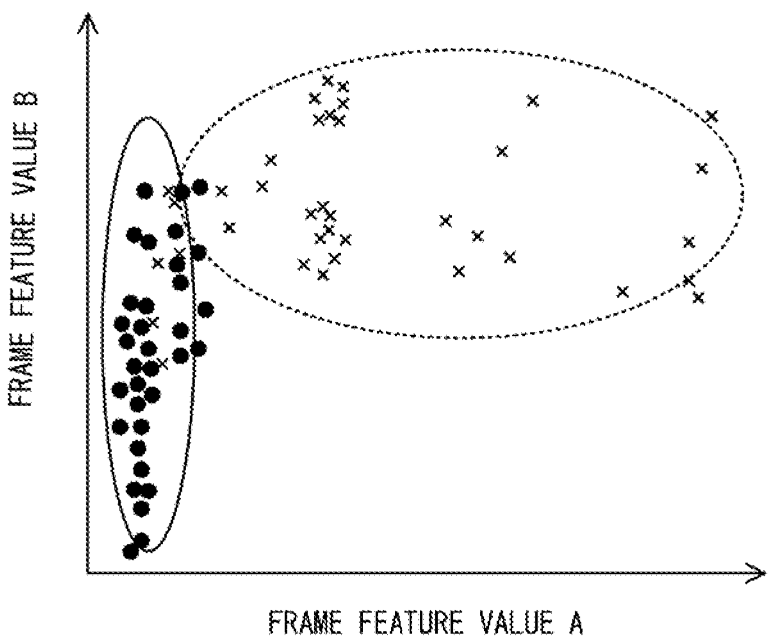
FIG. 4A is a diagram showing an image of processing of variable control of the number of samples of a feature value in the first example embodiment.
Figure 4B:
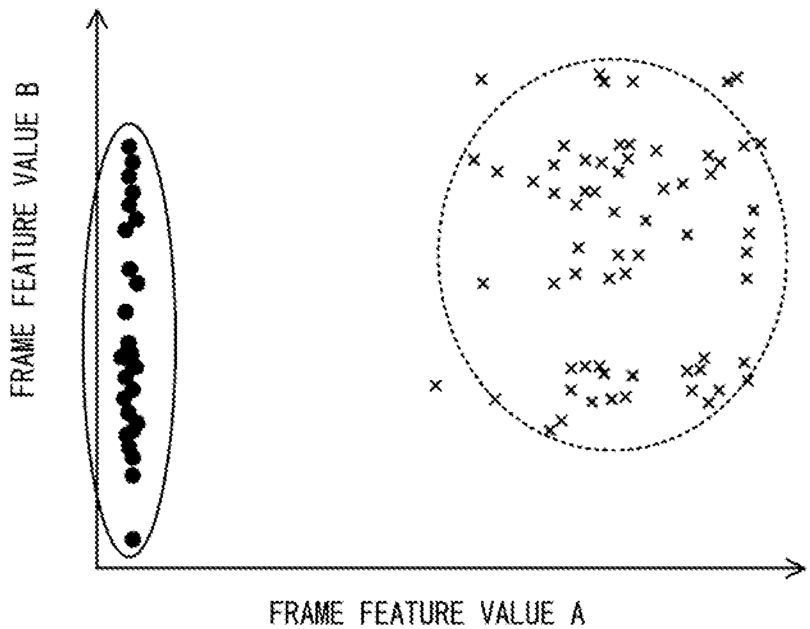
FIG. 4B is a diagram showing an image of processing of variable control of the number of samples of a feature value in the first example embodiment.

Next, a description will be given of a series of operations for controlling the output timing (the required number of samples of the feature value) using the distance calculation unit 80, the reliability determination unit 85, and the output timing change unit 90. FIGS. 4A and 4B are diagrams showing images of processing performed by the sample number variable control unit 50. FIGS. 4A and 4B show the results obtained by performing clustering processing on two-dimensional frame feature values (i.e., samples composed of two types of frame feature values). In FIGS. 4A and 4B, two clusters are shown: a first cluster, which is a set of samples represented by black dots; and a second cluster, which is a set of samples represented by x. Further, for each cluster, the position at a distance of 2σ (where σ is a standard deviation of the samples belonging to the cluster) from an average point of the samples belonging to the cluster is indicated by a circle. Specifically, in the first cluster, a solid circle indicates the position of the point of 2σ, and in the second cluster, a broken circle indicates the position of the point of 2σ. Note that the same applies to FIG. 5 which will be described later.

FIG. 4A shows an example in which it is determined that a distance between two clusters (circles representing the positions of the points of 2σ) is short and the reliability of clustering processing is low. In this case, the output timing change unit 90 controls the output timing so that a result of the analysis is not output until the number of samples to be clustered reaches the preset required number of samples of the feature value. On the other hand, FIG. 4B shows an example in which it is determined that a distance between two clusters (circles representing the positions of the points of 2σ) is long and the reliability of clustering processing is high. In this case, the output timing change unit 90 controls the output timing so that a result of the analysis is immediately output even when the number of samples to be clustered has not reached the preset required number of samples of the feature value.

A flow of the operation for controlling the output timing will be described below with reference to the flowchart shown in FIG. 3. The distance calculation unit 80 calculates a distance between respective clusters (between respective distributions) for a result of the clustering each time the analysis unit 40 performs clustering processing (S21). Note that a specific example of calculation of the distance will be described in detail later.

Then, the reliability determination unit 85 determines reliability based on the distance between the clusters calculated by the distance calculation unit 80 (S22). For example, if the distance between the respective clusters is still short (if the value of the distance between the clusters is small), the reliability determination unit 85 determines that the reliability is still low. Further, the reliability determination unit 85 determines that the reliability of the result of the clustering is high if the distance between the respective clusters is long (if the value of the distance between the clusters is large). The reliability determination unit 85 determines the reliability of each cluster as follows. The reliability determination unit 85 determines, based on the minimum distance between a cluster of interest (a cluster for which the reliability is to be determined) and each of the other respective clusters, the reliability of the cluster of interest. This is because when there is at least one cluster close to the cluster of interest, it is considered that the accuracy of the clustering of the cluster of interest is insufficient. Therefore, the reliability of the cluster of interest is determined by using the minimum distance among the distances between the cluster of interest and each of the other respective clusters. Note that a specific example of determination of reliability will be described in detail later.

Then the output timing change unit 90 controls whether to change the output timing based on the result of the determination of reliability performed by the reliability determination unit 85 (S23). When it is determined that the reliability of the result of the clustering is high, the output timing change unit 90 changes the number of samples of the feature value required to output the result to the number of samples of the feature value acquired up to that point in time, and starts outputting the result of the clustering from that point in time. On the other hand, when it is determined that the reliability is still low, the output timing change unit 90 does not change the output timing, and performs control so that the result of the clustering is output after waiting until the preset required number of samples of the feature value is analyzed.

Figure 5:
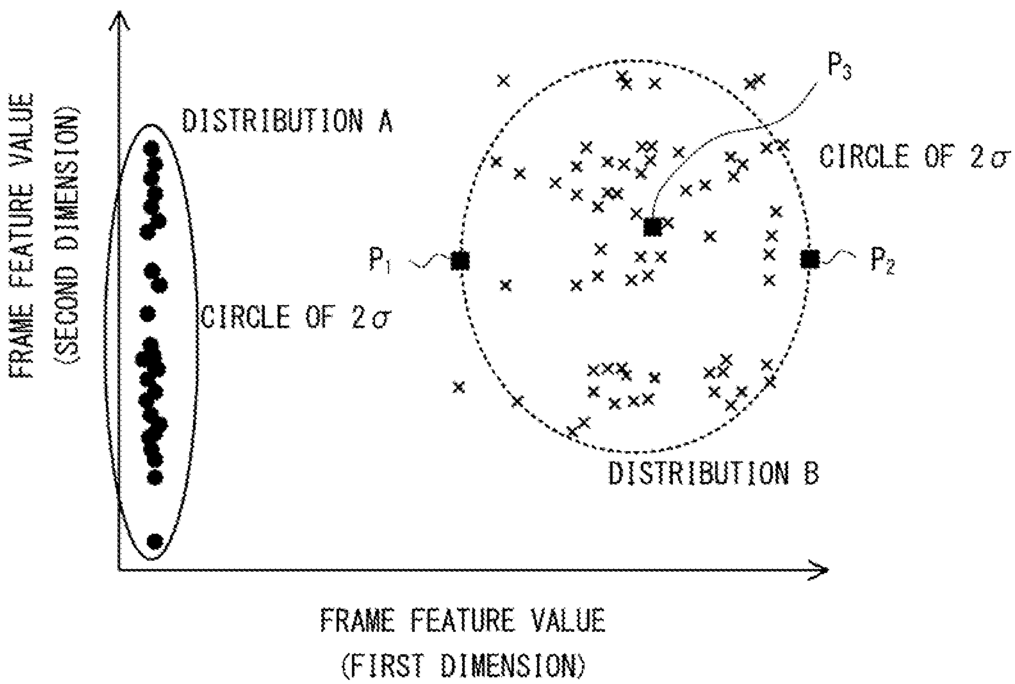
FIG. 5 is a diagram showing an example of a method for determining distances between a plurality of distributions.

A method for calculating a distance between clusters (S21) in the distance calculation unit 80 will be described with reference to FIG. 5. FIG. 5 schematically shows an example in which a distance between clusters is calculated by applying a "Mahalanobis distance". The Mahalanobis distance is one of methods for calculating a distance between an arbitrary point and an arbitrary distribution, and has a feature that the distance between the point and the distribution can be calculated by taking into account the variance (the standard deviation, the dispersion) of the distribution. Note that when the covariance matrix is a diagonal matrix (when there is no correlation between different dimensions (variables)), the Mahalanobis distance is also referred to as a "normalized Euclidean distance".

When the distribution to which the distance to the point is calculated is a one-dimensional distribution, a Mahalanobis distance D (g,b) between a point $X_g$ and this distribution is calculated by the following Expression. Note that, in the following Expression, $X_b$ with a bar above represents the average value of the distribution, and $V(X_b)$ represents the variance (the covariance) in the distribution.

$$D(g, b) = \frac{X_g - \overline{X_b}}{\sqrt{V(X_b)}} \quad \text{[Expression 2]}$$

When the distribution to which the distance to the point is calculated is a two-dimensional distribution, a Mahalanobis distance D (k,n) between a point $(u_k,v_k)$ and this distribution is calculated by the following Expression. Note that, in the following Expression, $\{u_n,v_n\}$ represents the average value for each dimension in the distribution, and $\{\lambda_p,\lambda_q\}$ represents the variance (the covariance) in the distribution.

[Expression 3]

$$D(k,n)=\sqrt{\left(\frac{u_k-u_n}{\sqrt{\lambda_p}}\right)^2+\left(\frac{v_k-v_n}{\sqrt{\lambda_q}}\right)^2}$$

When the distribution to which the distance to the point is calculated is an n-dimensional distribution, where n is an integer of three or greater, a Mahalanobis distance D (k,m) between the point $(1d_k, 2d_k, \ldots, nd_k)$ and this distribution is calculated by the following Expression. Note that, in the following Expression, $\{1d_m, 2d_m, \ldots, nd_m\}$ represents the average value for each dimension in the distribution, and $\{\lambda_1, \lambda_2, \ldots, \lambda_n\}$ represents the variance (the covariance) in the distribution.

[Expression 4]

$$D(k,m)=\sqrt{\left(\frac{1d_k-1d_m}{\sqrt{\lambda_1}}\right)^2+\left(\frac{2d_k-2d_m}{\sqrt{\lambda_2}}\right)^2+\cdots+\left(\frac{nd_k-nd_m}{\sqrt{\lambda_n}}\right)^2}$$

As described above, since the Mahalanobis distance is a method for calculating a distance between an arbitrary point and an arbitrary distribution, the distance calculation unit 80 calculates a distance between arbitrary cluster distributions, for example, as follows. Two types of calculation methods will be described below.

In the first calculation method, a distance between the point included in one distribution and the other distribution is obtained for each dimension, and then a distance between the distributions is obtained. Specifically, for example, when it is assumed that the standard deviation of each dimension of each distribution is σ, the distance calculation unit 80 first calculates, for each dimension, a Mahalanobis distance between the point of 2σ of a distribution A and a distribution B, and a Mahalanobis distance between the point of 2σ of the distribution B and the distribution A. For example, referring to FIG. 5, the Mahalanobis distance is calculated as follows. The calculation of the Mahalanobis distance for a first dimension will be described below. In FIG. 5, points $P_1$ and $P_2$ in the distribution B are points of 2σ of the distribution B. In this case, for the first dimension, the Mahalanobis distance between the point $P_1$ and the distribution A and the Mahalanobis distance between the point $P_2$ and the distribution A are calculated as the Mahalanobis distance between the point of 2σ of the distribution B and the distribution A. Similarly, for the first dimension, the Mahalanobis distance between the point of 2σ of the distribution A and the distribution B is calculated. That is, a total of four Mahalanobis distances are calculated here. Similarly, for the second dimension, four Mahalanobis distances are calculated. Then the distance calculation unit 80 sets the minimum Mahalanobis distance among the Mahalanobis distances calculated for the dimension of interest as the distance for this dimension of interest. For example, in the above-described example, for the first dimension, the minimum Mahalanobis distance among the above-described four Mahalanobis distances is the distance for the first dimension. Similarly, for the second dimension, the distance for this dimension is also determined. Then the distance calculation unit 80 sets the maximum value among the respective distances for the dimension as the distance (i.e., the distance between the clusters) between the above two distributions. In the above-described example, the maximum distance between the distance for the first dimension and the distance for the second dimension is calculated as the distance between the distribution A and the distribution B. Note that the reason why the maximum distance is selected among the distances of the respective dimensions is as follows. As shown in FIG. 5, the two distributions A and B form separate clusters. When only the coordinates of the first dimension (i.e., the horizontal axis of the graph) are considered, the range of the sample of the distribution A and the sample of the distribution B are separated. On the other hand, when only the coordinates of the second dimension (i.e., the vertical axis of the graph) are considered, the ranges of the two samples are substantially overlapped. As is obvious from FIG. 5, when the two distributions are separated in any dimension, they are separated. Therefore, in this calculation method, the maximum distance among the distances of the respective dimensions is selected.

In the second calculation method, a point of the average value of all dimensions in one distribution is obtained, the distance between the point and the other distribution is obtained, and the obtained distance is set as the distance between the distributions. First, the distance calculation unit 80 calculates a Mahalanobis distance between a point of an average value of an n-dimensional distribution A and the distribution B and calculates a Mahalanobis distance between a point of an average value of an n-dimensional distribution B and the distribution A. For example, referring to FIG. 5, the distance calculation unit 80 calculates a Mahalanobis distance between an average point $P_3$ of the distribution B and the distribution A. Similarly, the distance calculation unit 80 calculates a Mahalanobis distance between an average point (not shown) of the distribution A and the distribution B. Then the distance calculation unit 80 sets the minimum value (or the average value) of the calculated two distances as the distance (i.e., the distance between the clusters) between the two distributions. Note that, in the second calculation method, instead of the distance between one point of the average value in one distribution and the other distribution, all the distances between a plurality of points of 2σ in one n-dimensional distribution and the other distribution may be calculated, and the minimum distance among the calculated distances may be set as the distance between two clusters.

Although the example in FIG. 5 shows a case in which the Mahalanobis distance is applied as a method for calculating a distance between cluster distributions, other methods and indices may instead be used to calculate a distance between clusters. For example, the distance calculation unit 80 may calculate a Kullback-Leibler divergence and a cross entropy between the distributions A and B, and calculate the distance between the distributions by converting the result of the calculation. Note that the Kullback-Leibler divergence is non-negative information (a value of zero in the case of an exact match between distributions) corresponding to a degree of similarity between distributions, and is one of information sometimes used as an index for integrating clusters in clustering processing.

Next, an operation of determination (S22) performed by the reliability determination unit 85 will be described. The reliability determination unit 85 determines the reliability of the result of the clustering processing by using the distance between the clusters calculated by the distance calculation unit 80. The reliability determination unit 85 determines the reliability to be high when the clusters are separated from each other, and determines the reliability to be low when the clusters are close to each other. For example, when the distance calculation unit 80 has calculated the distance between the respective clusters by applying the Mahalanobis distance as shown in the example of FIG. 5, the value itself of the distance becomes a value corresponding to a multiplier of a standard deviation 6. Therefore, for example, the reliability determination unit 85 can calculate the reliability=3σ (about 99.7%) when the distance between the clusters=3, and the reliability=2σ (about 95.5%) when the distance between the clusters=2. Then, the reliability determination unit 85 determines, based on a predetermined reliability threshold, for example, that "reliability is high" when the value of the reliability is equal to or greater than the reliability threshold, and that "the reliability is still low" when the value of the reliability is smaller than the reliability threshold. Note that the reliability threshold is determined in accordance with the content of the analysis and the application thereof.

For example, when an analysis of the network configuration, such as an analysis as to whether each transmission node in the target network is a hub station or a terminal station, is performed based on the result of the clustering, the reliability determination unit 85 performs, for example, the following determination. When the reliability (the reliability based on the distance between the cluster and all other clusters) of the cluster to which the largest number of samples for the transmission node of interest belong is equal to or greater than the reliability threshold, the reliability determination unit 85 determines that "the reliability" of the result of the clustering (the result of the analysis) "is high". On the other hand, when the reliability of the cluster to which the largest number of samples for the transmission node of interest belong is less than the reliability threshold, the reliability determination unit 85 determines that "the reliability" of the result of the clustering (the result of the analysis) "is low". Note that, as described above, the reliability threshold may be, for example, 3σ (about 99.7%) or any other value (e.g., 2.5σ (about 98.8%) and 2σ (about 95.5%)).

Note that for example, a case in which a distance between the clusters is calculated assuming that the reliability threshold is 3σ by using the first calculation method described above means that it is determined whether or not a distance between the point closest to another cluster distribution among the points corresponding to the position of 2σ of one cluster distribution and the point of the average value of the other cluster distribution is larger than the range of 3σ of the other cluster.

It is possible to select whether the reliability determination is performed for each cluster to which the largest number of samples for the transmission node of interest belong or whether the reliability determination is collectively performed for all clusters in accordance with the application or the like, and any method may be used. That is, the timing at which a result of the analysis is output may be controlled based on the reliability of the cluster to which the largest number of samples for the transmission node of interest belong, or the timing at which a result of the analysis is output may be controlled based on the reliability for all the clusters. The reliability for all the clusters may be calculated, for example, based on the reliability of each cluster. The reliability for all the clusters may be, for example, the minimum value of the reliability of each cluster or the average value of the reliability of each cluster.

Figure 6:
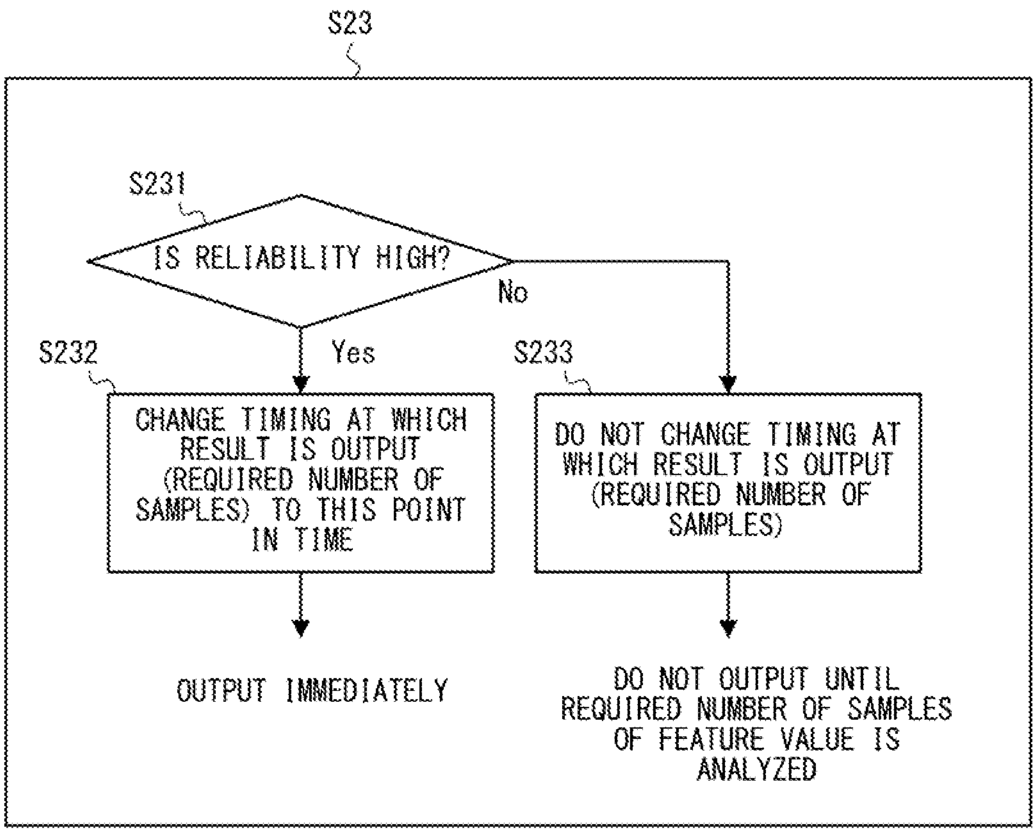
FIG. 6 is a diagram showing an example of a flow of processes of output timing change control in the first example embodiment.

Lastly, an operation of the output timing change unit 90 for controlling whether to change the number of samples of the feature value required to output a result of the analysis (S23) will be described. FIG. 6 is a diagram showing an example of a flow of processes performed by the output timing change unit 90. The output timing change unit 90 controls whether to change the output timing based on the result of the reliability determination performed by the reliability determination unit 85 (S231). That is, when the result of the reliability determination performed by the reliability determination unit 85 is that "the reliability is high", the number of samples of the feature value required to output the result is set as the number of samples of the feature value up to that point in time, and the output timing is changed so that the output is immediately started (S232). That is, the output timing change unit 90 performs control so that the output is started from that point in time without waiting until the number of samples to be analyzed reaches a predetermined required number of samples of the feature value. On the other hand, when it is determined that "the reliability is still low", the output timing change unit 90 does not change the output timing, and performs control so that the result of the clustering (the result of the analysis) is output after waiting until the required number of samples of the feature value set in advance by the sample number setting unit 70 is analyzed (S232).

As described above, in the first example embodiment, the reliability is determined from the distance between the clusters by the operations of the distance calculation unit 80, the reliability determination unit 85, and the output timing change unit 90 included in the sample number variable control unit 50, and the timing at which the result is output is dynamically changed in accordance with the determined reliability. That is, when the reliability of the result of the clustering processing is less than a predetermined threshold, the output timing change unit 90 controls the output unit 60 so as to output the result of the analysis at the time when the clustering processing is performed on the frame feature value for the preset first number of samples. Further, when the reliability of the result of the clustering processing is not less than the predetermined threshold, the output timing change unit 90 controls the output unit 60 so as to immediately output the result of the analysis regardless of whether or not the number of samples has reached the aforementioned first number. That is, the timing at which the result is output can be advanced only when the reliability of the result of the clustering is high. This leads to the effect that the time required to output the result can be reduced while still maintaining the high accuracy of estimation of the configuration of the target network and the high accuracy of an analysis of the same. That is, there is an advantage that it is possible to adaptively increase the speed of, for example, the estimation of the configuration of the target network using radio frame analysis.

Second Example Embodiment

Figure 7:
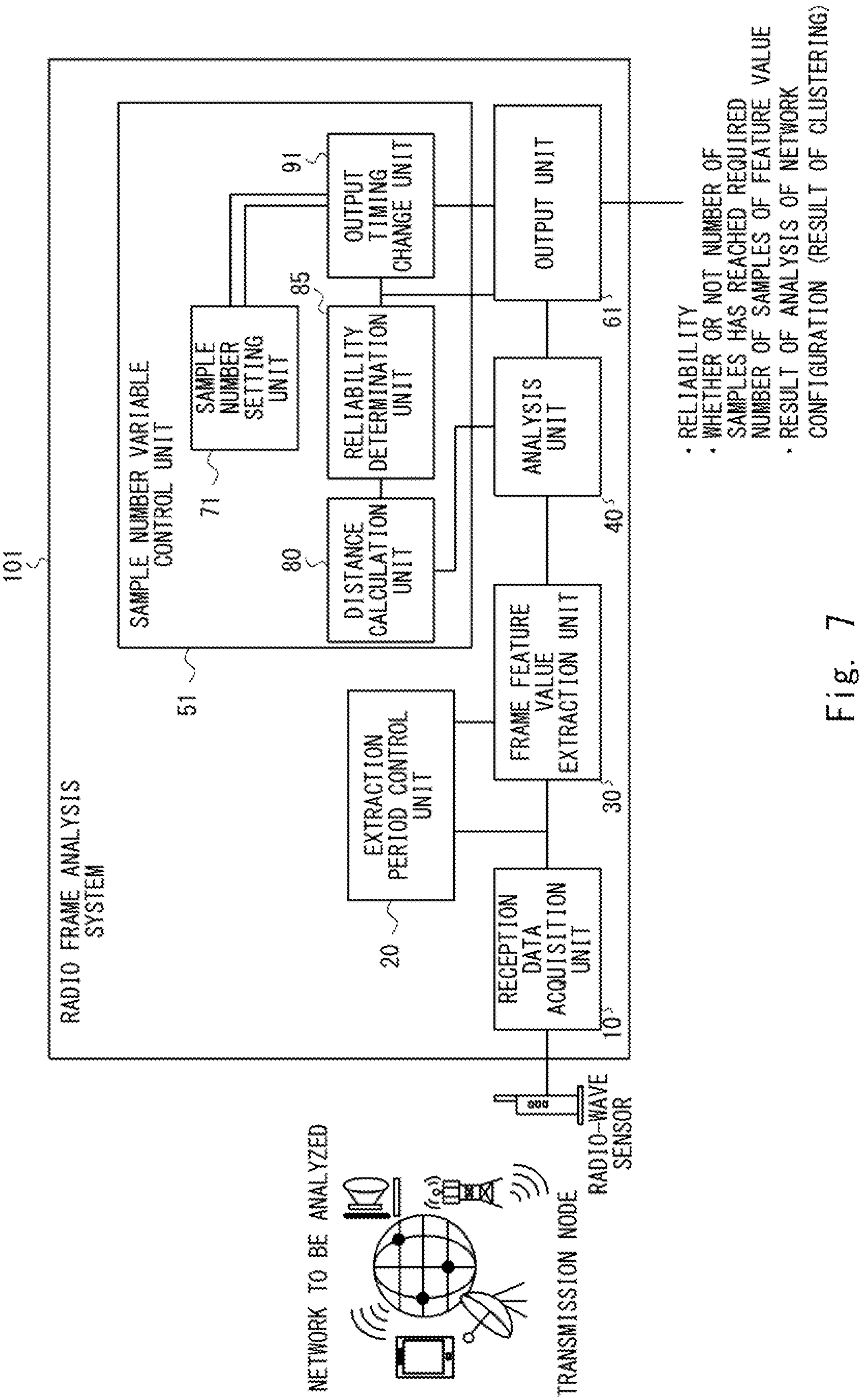
FIG. 7 is a diagram showing an overall configuration of a radio frame analysis system according to a second example embodiment.

FIG. 7 is a diagram showing a configuration example of a radio frame analysis system according to a second example embodiment. Specifically, FIG. 7 is a diagram showing a configuration example of a radio frame analysis system 101 that outputs a distance between clusters (i.e., reliability or similarity between clusters) together with a result of the analysis in order to externally visualize a status of the analysis. Further, the second example embodiment also shows an example of a configuration in which the reliability of the result of the analysis to be output is further increased by using the minimum required number of samples of the feature value even if the reliability determined by the reliability determination unit 85 is high. Note that although this example embodiment includes both a feature that a distance between clusters and the like are output together with a result of the analysis and a feature that the minimum required number of samples of the feature value is used, it is also possible to provide an example embodiment including only one of them.

<Description of Configuration>

The radio frame analysis system 101 according to the second example embodiment includes, as in the case of the first example embodiment, the reception data acquisition unit 10, the extraction period control unit 20, the frame feature value extraction unit 30, the analysis unit 40, a sample number variable control unit 51, and an output unit 61. Here, the sample number variable control unit 51 includes, as in the case of the first example embodiment, a sample number setting unit 71, the distance calculation unit 80, the reliability determination unit 85, and an output timing change unit 91. Note that although not shown in the figure, the system may further include, behind (i.e., the output side of) the output unit 61, an analysis result visualization unit that visualizes, for a user, the configuration of the target network, features of each transmission node, and/or the like by using the result output from the output unit 61.

Since the reception data acquisition unit 10, the extraction period control unit 20, the frame feature value extraction unit 30, and the analysis unit 40 included in the radio frame analysis system 101 have already been described in the first example embodiment, the descriptions thereof will be omitted.

The output unit 61, like the output unit 60 in the first example embodiment, outputs a result of the analysis performed by the analysis unit 40 in accordance with an output timing specified by the sample number variable control unit 51. Note that, as a configuration unique to the second example embodiment, the output unit 61 outputs the following information together with a result of the analysis in order to externally visualize a status of the analysis. The output unit 61 outputs, for example, a distance between respective clusters, that is, reliability, together with a result of the analysis. Further, the output unit 61 may also output information indicating whether or not the number of samples to be analyzed has reached the required number of samples of the feature value together with a result of the analysis.

The distance calculation unit 80 and the reliability determination unit 85 included in the sample number variable control unit 51 have already been described in the first example embodiment. However, as a configuration unique to the second example embodiment, information to be output (such as distance information and reliability information) is output from the sample number variable control unit 51 to the output unit 61.

Further, the sample number setting unit 71, like the sample number setting unit 70 according to the first example embodiment, sets a predetermined value as the required number of samples of the feature value. However, as a configuration unique to the second example embodiment, in addition to the setting of the required number of samples (the first required number of samples of the feature value) of the feature value similar to that of the first example embodiment, the sample number setting unit 71 performs the setting of the minimum required number of samples (the second required number of samples of the feature value) of the feature value.

The output timing change unit 91, like the output timing change unit 90 according to the first example embodiment, controls the timing at which a result of the analysis is output based on the reliability determined by the reliability determination unit 85 and the required number of samples of the feature value set in advance by the sample number setting unit 71. However, as a configuration unique to the second example embodiment, the output timing change unit 91 controls the output timing using two different required numbers of samples of the feature value set by the sample number setting unit 71.

<Description of Operation>

Operations in the second example embodiment will be described with reference to FIGS. 8 and 9.

Figure 8:
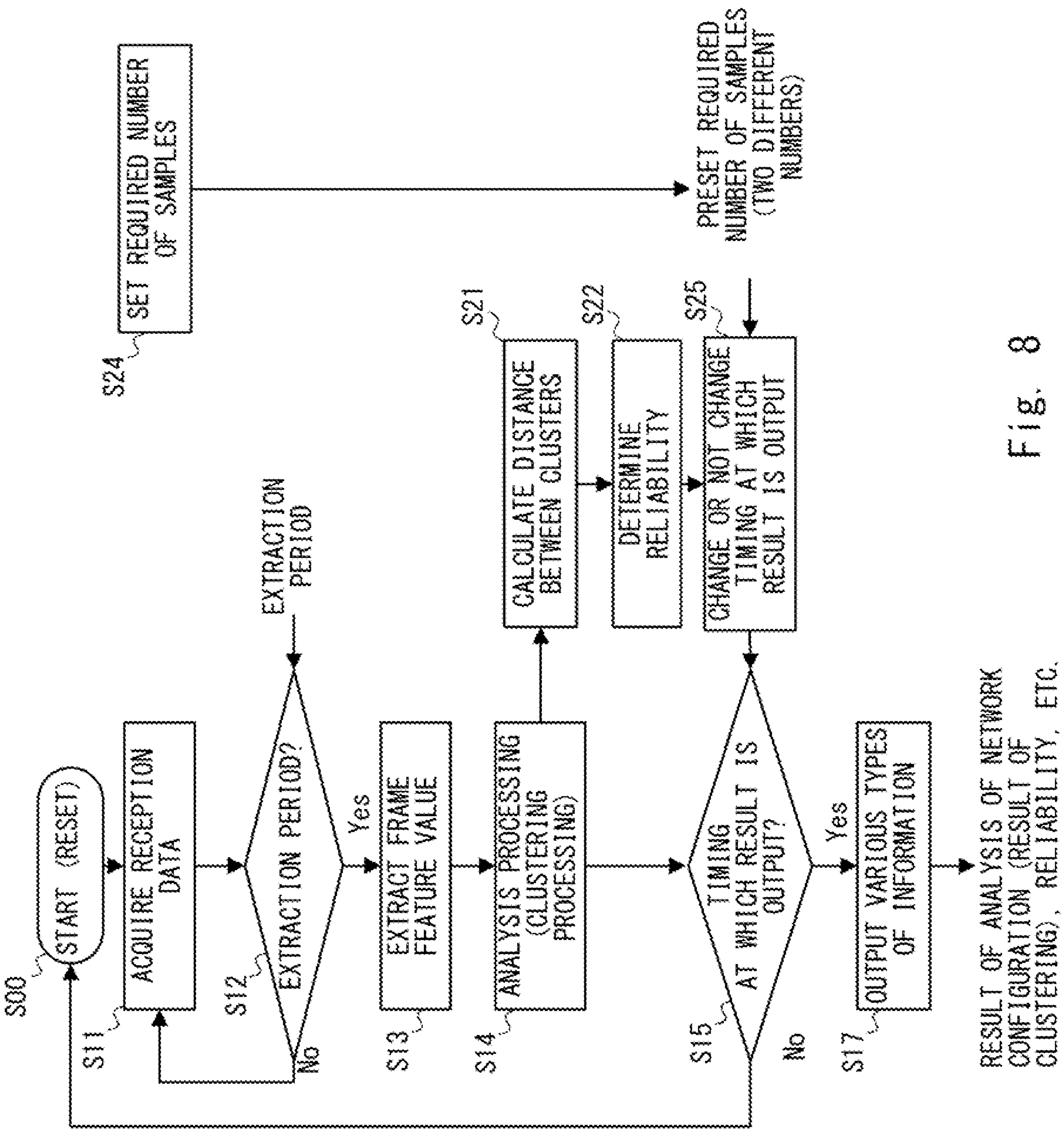
FIG. 8 is a diagram showing a flow of processes performed by the radio frame analysis system according to the second example embodiment.
Figure 9:
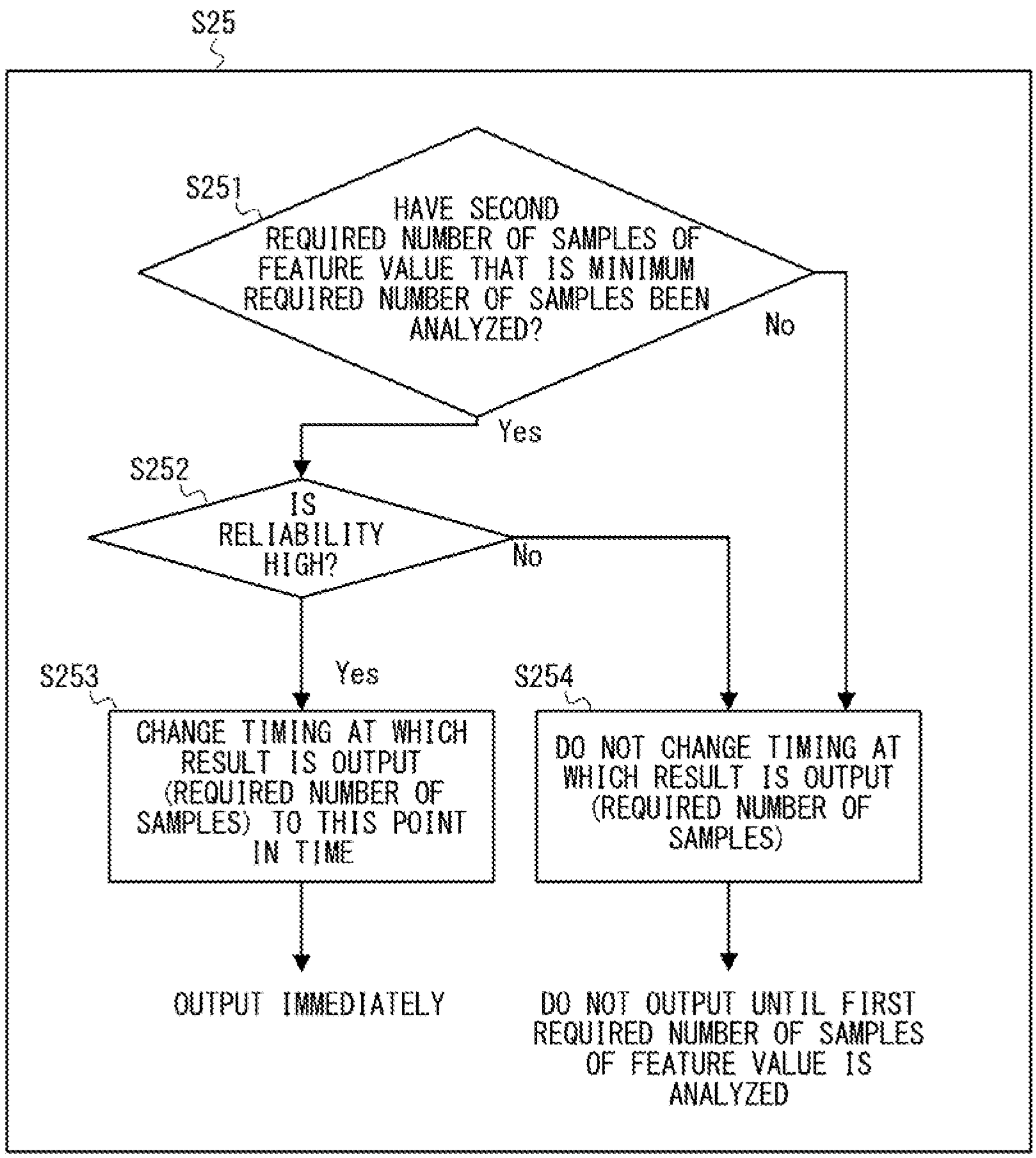
FIG. 9 is a diagram showing an example of a flow of processes of output timing change control in the second example embodiment.

FIG. 8 shows a flow of processes performed by the radio frame analysis system 101 according to the second example embodiment. The process flow in the radio frame analysis system 101 is substantially the same as that in the first example embodiment. However, as a process unique to the second example embodiment, it includes the setting of two different required numbers of samples of the feature value performed by the sample number setting unit 71 (S24). The first required number of samples of the feature value is the number of samples determined in advance empirically (experimental) or statistically as in the case of the first example embodiment. More specifically, the first required number of samples of the feature value is the number of samples of the feature value required to be able to output a reliable result of the analysis, which is determined in consideration of various types of external environments, any network configurations, and other possible conditions. On the other hand, the second required number of samples of the feature value unique to the second example embodiment is the minimum required number of samples of the feature value required to output a result of the analysis even when the reliability based on the distance between the clusters is determined to be “high”. Inevitably, the second required number of samples of the feature value is a numerical value smaller than the first required number of samples of the feature value.

For example, either one of the following two methods can be used as a method for setting the minimum second required number of samples of the feature value. The first setting method is an empirical (experimental) setting method. For example, assume a case in which in order to estimate the network configuration from the samples acquired in one minute which is assumed to be the time required to make the communication stable, the number of samples of the feature value that can be acquired in one minute is set as the first required number of samples of the feature value as in the case of the first example embodiment. In this case, for example, the sample number setting unit 71 sets, as the second required number of samples of the feature value, the number of samples of the feature value that can be acquired in, for example, the first 10 seconds.

The second setting method is a setting method using the statistical method described in the first example embodiment. In this case, as an example in which the second required number of samples of the feature value, the sample number setting unit 71 may set the number of samples as follows. The sample number setting unit 71 may calculate the statistically minimum number of samples by setting the value of a confidence coefficient (a confidence interval) of the population proportion to a lower value or setting the value of an error in the accuracy of estimation to a larger value than that in the case in which the first required number of samples of the feature value is calculated. For example, the value of the confidence coefficient (the confidence interval) of the population proportion used for the calculation of the required number of samples may be set to a low value that is the minimum required value, or the value of the error in the accuracy of estimation may be set to a value of an error that is the maximum allowable value.

Note that any setting method can be adopted as a method for setting two different required numbers of samples of the feature value. Therefore, the sample number setting unit 71 only needs to set two different required numbers of samples of the feature value having different values, and any method can be adopted as a method for determining a specific value.

The control of whether or not the output timing (the required number of samples of the feature value) is changed by the output timing change unit 91 (S25) is also an operation unique to the second example embodiment. FIG. 9 is a diagram showing an example of a flow of processes performed by the output timing change unit 91 according to the second example embodiment. The output timing change unit 91 first determines whether or not the second required number of samples of the feature value set as the minimum required number of samples have been analyzed (S251). If the output timing change unit 91 determines that the second required number of samples of the feature value have not been analyzed yet, it does not change the output timing (S254). That is, in this case, the radio frame analysis system 101 is in a state in which it waits for outputting. That is, in this case, the output timing change unit 91 does not change the output timing, and performs control so that the result of the clustering (the result of the analysis) is output after waiting until the first required number of samples of the feature value set in advance by the sample number setting unit 70 is analyzed. On the other hand, if the second required number of samples of the feature value have already been analyzed, the output timing change unit 91 controls whether to change the output timing based on the result of the reliability determination performed by the reliability determination unit 85 (S252). That is, when the result of the reliability determination performed by the reliability determination unit 85 is that "the reliability is high", the number of samples of the feature value required to output the result is set as the number of samples of the feature value up to that point in time, and the output timing is changed so that the output is immediately started (S253). That is, the output timing change unit 91 performs control so that the output is started from that point in time without waiting until the number of samples to be analyzed reaches a predetermined first required number of samples of the feature value. On the other hand, when it is determined that "the reliability is still low", the output timing change unit 91 does not change the output timing, and performs control so that the result of the clustering (the result of the analysis) is output after waiting until the first required number of samples of the feature value set in advance by the sample number setting unit 71 is analyzed (S254).

Further, output of information such as reliability, which is an operation unique to the second example embodiment, will be described. The output unit 61 outputs information for supplementing the result of the analysis together with the result of the clustering (the result of the analysis of the configuration of the target network and the like). The output unit 61 outputs, as information for supplementing the result of the analysis, for example, information about the reliability determined by the reliability determination unit 85 and information about whether or not the number of clustered samples has reached the required number of samples of the feature value (S17). Note that the information about the reliability determined by the reliability determination unit 85 may include not only the result of the determination on the reliability used by the output timing change unit 91 to determine whether or not to change the output timing (the required number of samples of the feature value) but also detailed information for each cluster. FIG. 10 is a diagram showing an example of detailed output information for each cluster. For example, the detailed information for each cluster may include information indicating the result of the determination on the reliability for each cluster (the value of the reliability) and the value of the distance between the respective clusters used for that determination, and information of each cluster (e.g., statistics such as an average value and variance). Further, when the information about whether or not the number of clustered samples has reached the required number of samples of the feature value is output, a result of the analysis that has not yet reached the output timing, that is, a result of the analysis in a low reliability state, may be output as a reference in an intermediate stage.

As described above, in the second example embodiment, the second minimum required number of samples of the feature value is additionally set, and this second required number of samples of the feature value is referred to when the change of the output timing is controlled based on the reliability calculated from the distance between the clusters. Then, if the second required number of samples of the feature value have not been analyzed, it is considered that the reliability of the cluster alone is low and hence the result of the analysis is not output. As described above, in this example embodiment, the output timing change unit 91 performs the following control. That is, even when the determined reliability is equal to or greater than a predetermined threshold, the output timing change unit 91 controls the output unit 61 so that it does not output a result of the analysis when the number of samples to be analyzed has not reached a preset second number. Here, the second number is a predetermined number of samples smaller than a first number which is a predetermined number of samples required to output the result of the analysis when the determined reliability is less than the predetermined threshold. By this configuration, there is an advantage that it is possible to output a more reliable result of the analysis than that in the first example embodiment, which result of the analysis being obtained by taking into account both the reliability of the cluster alone and the reliability based on the distance between the clusters.

Further, in the second example embodiment, information for supplementing the result of the analysis is output together with the result of the clustering (the result of the analysis of the configuration of the target network), whereby it is possible to visualize various types of information related to the result of the analysis for an external user. By this configuration, there is an advantage that it is possible for an external user to know, for example, the accuracy of the result of the analysis of the configuration of the target network (e.g., the specifications of each transmission node) in real time.

Third Example Embodiment

Figure 11:
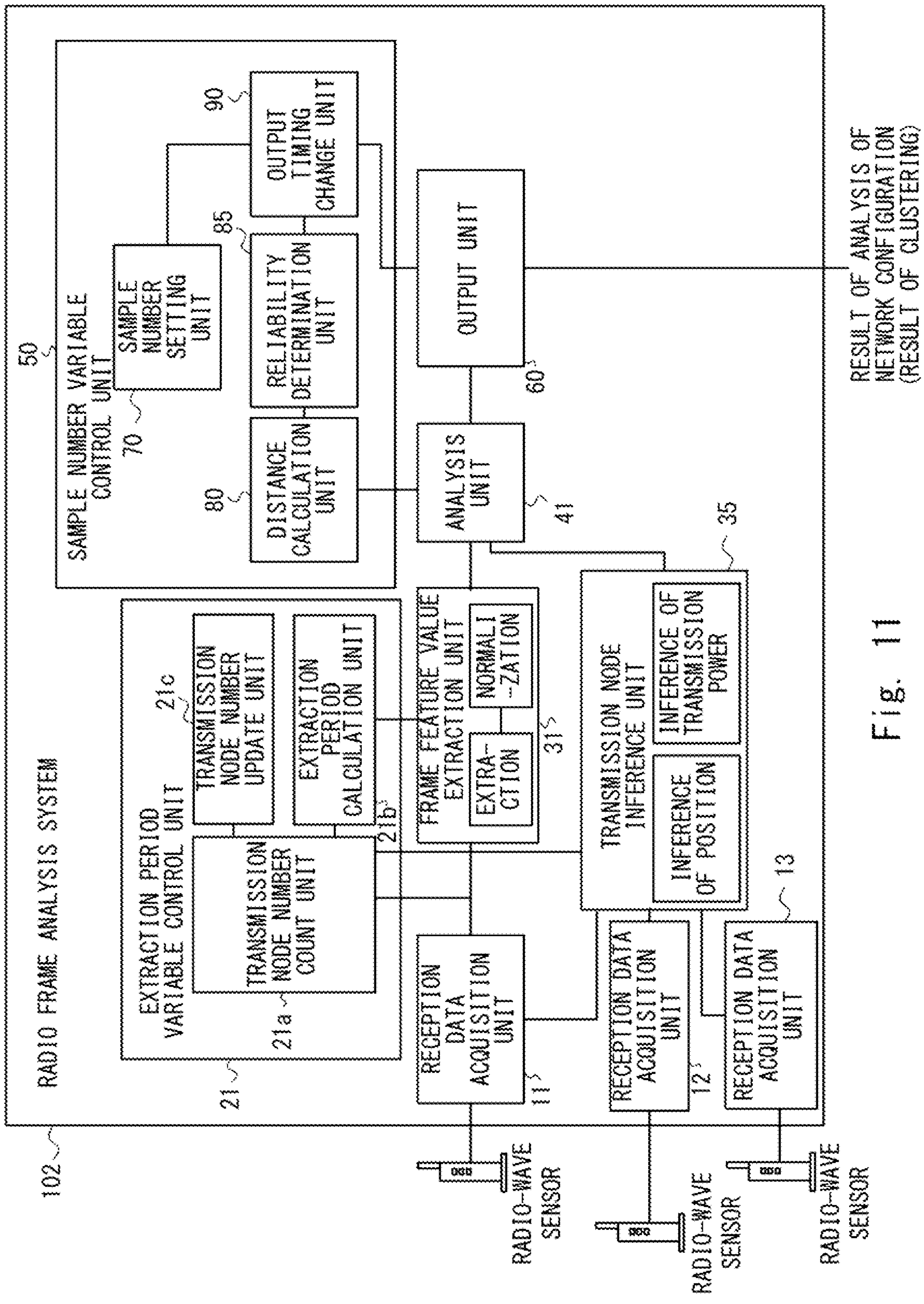
FIG. 11 is a diagram showing an overall configuration of a radio frame analysis system according to a third example embodiment.

FIG. 11 is a diagram showing a configuration example of a radio frame analysis system according to a third example embodiment. Specifically, FIG. 11 is a diagram showing a configuration example of a radio frame analysis system 102 including an extraction period variable control unit that variably controls an extraction period which is a period during which the frame feature value is extracted. Further, the radio frame analysis system 102 according to this example embodiment is also a radio frame analysis system that estimates a position and transmission power of each transmission node by using a plurality of radio-wave sensors and then analyzes a radio frame. Note that although this example embodiment includes both of a feature that the extraction period is variably controlled and a feature that the position of each transmission node and the transmission power are estimated by using a plurality of radio-wave sensors, it is also possible to provide an example embodiment including only one of them.

<Description of Configuration>

The radio frame analysis system 102 according to the third example embodiment includes reception data acquisition units 11, 12, and 13, an extraction period variable control unit 21, a frame feature value extraction unit 31, a transmission node inference unit 35, an analysis unit 41, the sample number variable control unit 50, and the output unit 60. Here, as a configuration unique to the third example embodiment, the extraction period variable control unit 21 includes a transmission node number count unit 21*a*, an extraction period calculation unit 21*b*, and a transmission node number update unit 21*c*, in order to dynamically variably control an extraction period. Further, the frame feature value extraction unit 31 includes a frame feature value normalization unit that normalizes an extracted frame feature value. Note that, in the example shown in FIG. 11, like in the case of the first example embodiment, the sample number variable control unit 50 and the output unit 60 are included, but the sample number variable control unit 51 and the output unit 61 described in the second example embodiment may instead be used.

The transmission node number count unit 21*a* included in the extraction period variable control unit 21 extracts transmission node information from the reception data sequence and counts the number of transmission nodes. Then, when data transmitted from transmission nodes corresponding to a "predetermined number of transmission nodes", which is set in advance, have been received, the extraction period calculation unit 21*b* determines the subsequent extraction period (i.e., the length of the subsequent extraction period) from the time that has been taken until then and the information about the aforementioned number of transmission nodes, and transmits information about the determined extraction period to the frame feature value extraction unit 31. Further, when the total number of transmission nodes counted by the transmission node number count unit 21*a* exceeds the "predetermined number of transmission nodes", the transmission node number update unit 21*c* updates this "predetermined number of transmission nodes" and transfers the updated number to the transmission node number count unit 21*a*.

Further, as a configuration unique to the third example embodiment, the radio frame analysis system 102 includes a plurality of reception data acquisition units 11, 12, and 13 which acquire reception data sequences from a plurality of respective radio-wave sensors disposed in a plurality of places. Note that although three radio-wave sensors and three reception data acquisition units are show in the example shown in FIG. 11, the number of these components is not limited to three. Further, the reception data acquisition units 11, 12, and 13 may be physically located inside the radio frame analysis system 102, or may be located in the respective radio-wave sensors. Further, the radio frame analysis system 102 includes the transmission node inference unit 35. The transmission node inference unit 35 receives received radio-wave strength information (received power information), which is one of the radio frame information pieces acquired by the reception data acquisition units 11, 12, and 13, and estimates (or infers) the transmission position from which the reception data signal was transmitted and the transmission power thereof. The transmission node inference unit 35 may estimate (or infer) only one of the transmission position and the transmission power of each transmission node.

The frame feature value extraction unit 31 extracts a frame feature value from the radio frame information of the reception data sequence in accordance with the extraction period determined by the extraction period variable control unit 21. The frame feature value extraction unit 31 normalizes the extracted frame feature value, and then outputs the normalized frame feature value to the analysis unit 41. As described above, in this example embodiment, the transmission node number count unit 21*a* counts the number of transmission nodes in the reception data sequence, and the extraction period calculation unit 21*b* calculates an extraction period based on a result of the counting by the transmission node number count unit 21*a*. Then the frame feature value extraction unit 31 extracts a frame feature value from the reception data sequence received in the calculated extraction period.

The analysis unit 41, like the analysis unit 40 according to the first and the second example embodiments, performs analysis using clustering processing by using each extracted frame feature value. However, as one of the frame features used for analysis, the analysis unit 41 may further use information about the transmission power of each transmission node estimated (or inferred) by the transmission node inference unit 35. That is, the analysis unit 41 analyzes the configuration of the target network, the type of the transmitted content, the feature of each transmission node, and the like by using the aforementioned information items. Further, the analysis unit 41 may distinguish which transmission node the frame feature value to be clustered belongs to based on the position information of the transmission node estimated (or inferred) by the transmission node inference unit 35. As described above, in this example embodiment, the analysis unit 41 may perform analysis using information about the transmission power or the transmission position estimated (or inferred) for each transmission node.

<Description of Configuration>

Figure 12:
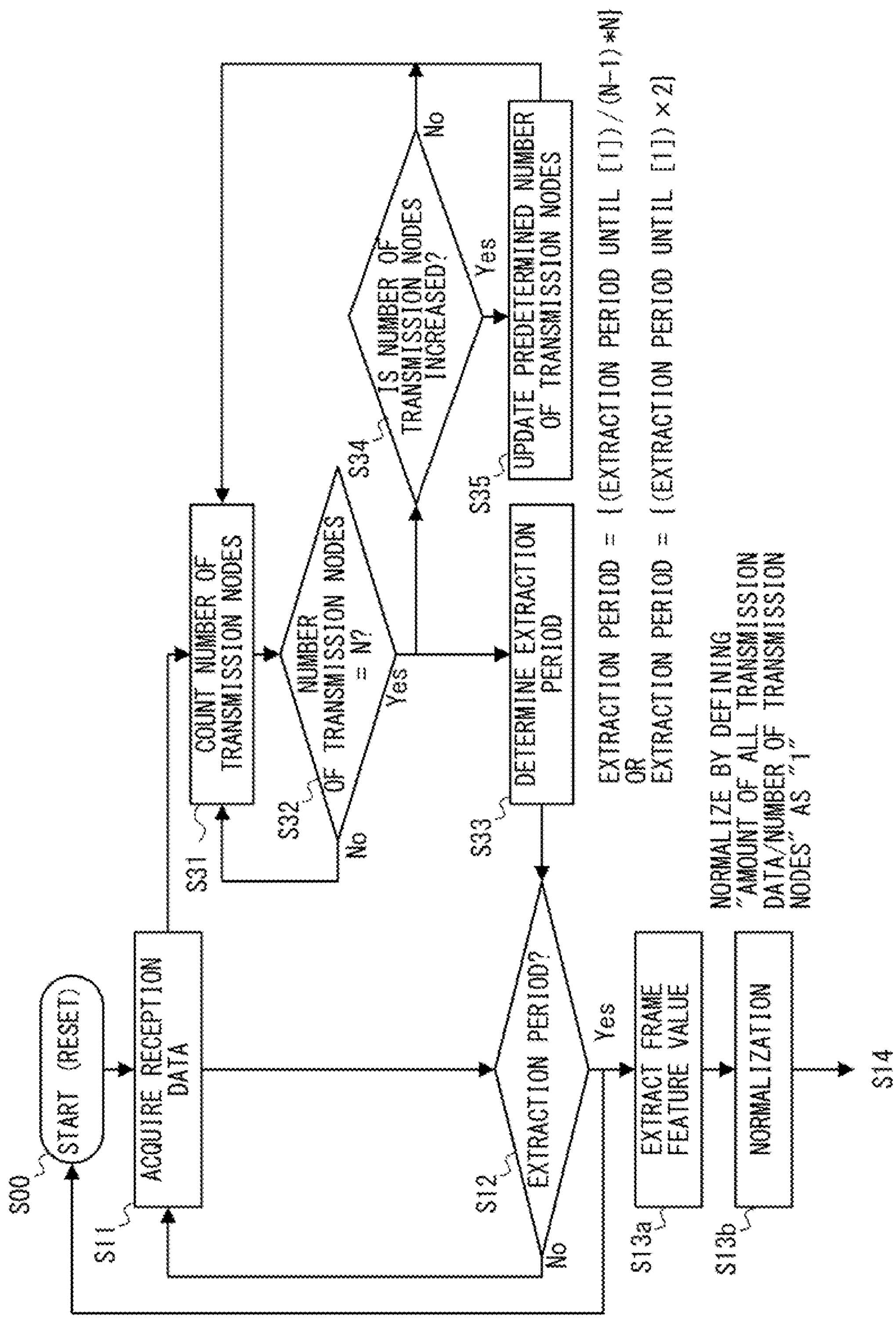
FIG. 12 is a diagram showing an example of a flow of processes of extraction period variable control in the third example embodiment.

Operations in the third example embodiment will be described with reference to FIGS. 12 and 13.

The process flow in the radio frame analysis system 102 according to the third example embodiment is substantially the same as that in the first and the second example embodiments shown in FIGS. 3 and 8. However, as an operation unique to the third example embodiment, the extraction period variable control unit 21 dynamically performs variable control of the extraction period. FIG. 12 is a diagram showing a flow of processes performed by the extraction period variable control unit 21, and FIG. 13 is a diagram showing an image of processes performed by the extraction period variable control unit 21.

Figure 13:
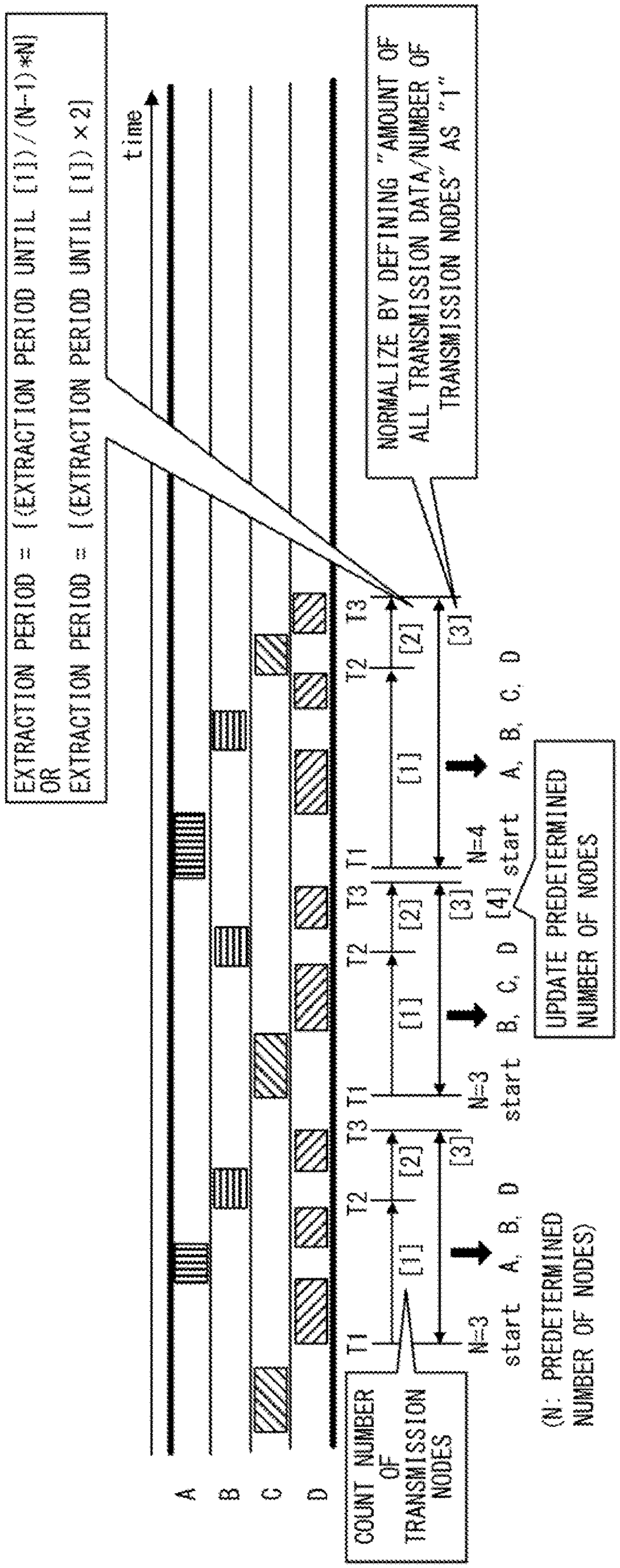
FIG. 13 is a diagram showing an image of processing of the extraction-period variable control in the third example embodiment.

In the extraction period variable control unit 21, the transmission node number count unit 21*a* starts counting the number of transmission nodes based on the radio frame information acquired by the reception data acquisition unit 11 (S31, [1] in FIG. 13). Note that, for example, in the case of Wi-Fi (Registered Trademark), the information about the transmission node such as the MAC address is acquired from the radio frame information. Further, the information of the transmission node may be acquired by other methods such as inferring a transmission node information from the position or the transmission power of the transmission node estimated (or inferred) by the transmission node inference unit 35, or identifying a transmission node from information about the signal waveform in the physical layer. Then, when the number of transmission nodes reaches a predetermined number N of transmission nodes, which is set in advance (S32), the process proceeds to a process for determining the extraction period performed by the extraction period calculation unit 21*b* (S33, [2] in FIG. 13). Note that as the predetermined number of transmission nodes N, the minimum number of nodes that is presumed according to the specifications of the network to be analyzed may be set. Alternatively, when the specifications of the network to be analyzed are unknown, the minimum number that is meaningful as a network (e.g., three) is set. In the example shown in FIG. 13, the initial value of the predetermined number N of transmission nodes is set to three (i.e., N=3). The extraction period calculation unit 21*b* calculates the extraction period for extracting a frame feature value by using an elapsed time T1_2 from a timing T1 at which the counting of the number of transmission nodes is started to a timing T2 at which the number of transmission node reaches the predetermined number N of transmission nodes (i.e., a time corresponding to the period [1] in FIG. 13), and the information about the counted number N of transmission nodes. Specifically, the extraction period calculation unit 21*b* calculates the extraction period as follows. The time T2 can be considered to be a timing at which the first data of Nth transmission node (N=M), which is the predetermined number of transmission nodes, is acquired. Therefore, the extraction period calculation unit 21*b* calculates a data transmission time T2_3 corresponding to the data transmission time of one transmission node by dividing the halfway elapsed time T1_2 from the time T1 to the time T2 by a number (M−1), which is one less than the counted number (S33, [2] in FIG. 13). Then, the extraction period calculation unit 21*b* defines a period that is obtained by adding the data transmission time T2_3 corresponding to the data transmission time of one transmission node to the time that has taken until the number of transmission nodes reaches the predetermined number (i.e., the halfway elapsed time T1_2) as the extraction period for extracting a frame feature value. That is, after the number of observed transmission nodes reaches the predetermined number of transmission nodes, the extraction period calculation unit 21*b* extends the extraction period by adding the data transmission time T2_3 corresponding to the data transmission time of one transmission node, and thereby determines an extraction period T1_3 corresponding to the data transmission time of M transmission nodes (S33, [3] in FIG. 13). Specifically, the period that is obtained by dividing the elapsed time T1_2 (the period [1]) by the number (M−1) and then multiplying it by the number M is calculated as the extraction period T1_3 (the period [3]) (T1_3=T1_2×M/(M−1)). That is, the start timing of the extraction period for extracting a frame feature value is the timing T1 at which the counting of the number of transmission nodes is started. Further, the end timing of the extraction period for extracting a frame feature value is a timing at which the data transmission time T2_3 corresponding to the data transmission time of one transmission node has elapsed from the timing T2 at which the number of observed transmission nodes reaches the predetermined number of transmission nodes. Note that if the number of observed transmission nodes increases (e.g., if data is received from an (N+1)th or an (N+2)th transmission node) during the calculation of the extraction period performed by the extraction period calculation unit 21*b*, the extraction period calculation unit 21*b* may calculate the extraction period as follows. That is, the extraction period calculation unit 21*b* newly defines a timing at which another transmission node is observed as a timing T2 and defines the number M as the number of observed nodes (i.e., for example, M=N+1 or M=N+2). Then, the extraction period calculation unit 21*b* newly calculates an extraction period (T1_3=T1_2×M/(M−1)) (i.e., calculates the period [3]).

Another example of a method (S33, [2] in FIG. 13) by which the extraction period calculation unit 21*b* calculates the data transmission time T2_3 corresponding to the data transmission time of one M-th transmission node will be described below. The extraction period calculation unit 21*b* may calculate the data transmission time T2_3 in consideration of the possibility that all the {M−1} transmission nodes, of which the number is one less than the counted number, are slave stations (terminal stations) and only the M-th transmission node is a hub station (a control station, root node, etc.). That is, the extraction period calculation unit 21*b* sets the data transmission time T2_3 corresponding to the data transmission time of one M-th transmission node to the same time as the halfway elapsed time T1_2 from the time T1 to the time T2. In this case, specifically, the extraction period calculation unit 21*b* calculates a value obtained by multiplying the elapsed time T1_2 [1] by two as the extraction period T1_3 [3] corresponding to the data transmission time of the M transmission nodes (T1_3=T1_2×2).

The reception data acquisition unit 11 acquires radio frame information from a reception data sequence (S11). The reception data acquisition unit 11 continues acquiring the radio frame information until the extraction period notified from the extraction period variable control unit 21 has expired (S12).

Then, the frame feature value extraction unit 31 extracts a frame feature value such as an amount of transmission data for each transmission node in the extraction period calculated by the extraction period variable control unit 21 (S13*a*), and normalizes the extracted frame feature value (S13*b*). In this normalization process, for example, the frame feature value in each transmission node (each_frame_feature) is normalized by converting the sum of the frame feature values (Sum_of_each_frame_feature), such as the sum of amounts of transmission data acquired from all of the transmission nodes M, into a value corresponding to the number M, i.e., the number of transmission nodes. That is, the value of the extracted frame feature value is normalized by using the number M, i.e., the number of transmission nodes. For example, when the sum of frame feature values is represented as Sum_of_each_frame_feature and the normalization is performed so that its value becomes the number M, the normalized frame feature value of each transmission node (Each_Normalized_frame feature) can be normalized as {Each_Normalized_frame_feature}=M×{each_frame_feature}/{Sum_of_each_frame_feature}. This means that, even if the number of transmission nodes is different, when the ratio among the frame feature values such as the amounts of transmission data during the extraction period is uniform over all the transmission nodes, the normalized frame feature value of each transmission node is always normalized to a value equivalent to one and output in such a normalized state. (In the case of ({each_frame_feature}=={Sum_of_each_frame_feature}/M), the relation {Each_Normalized_frame_feature=1} holds). That is, even if the extraction period and/or the number of transmission nodes are variable, the frame feature value is always normalized to the same value unless the relation among the relative frame feature values of transmission nodes is changed. By the extraction period being repeatedly calculated by the extraction period variable control unit 21, and the frame feature value being continuously and repeatedly extracted and normalized by the frame feature value extraction unit 31, it is possible for a desired network analysis to be performed by the subsequent component such as the analysis unit 40.

Lastly, a transmission node number update process performed by the transmission node number update unit 21*c* (S34 and S35) will be described. In the example of the process shown in FIG. 13, for example, the counting of the number of transmission nodes in the first extraction period is started with a predetermined number N of transmission nodes (N=3) and three transmission nodes D, A and B are counted in this order. Next, in the counting of the number of transmission nodes in the second extraction period, it is started with N=3 as in the case of the first extraction period, and three transmission nodes C, D and B are counted in this order. Note that since the three nodes A, B and D are detected in the first period and the three nodes B, C and D are detected in the second period, it is found that at least four transmission nodes A, B, C and D exist in the two extraction periods. When the number of existing transmission nodes exceeds the predefined predetermined number of transmission nodes (N=3 in this example) as described above (S34), the transmission node number update unit 21*c* performs a process for updating "the predetermined number of transmission nodes" that will be set in the next and subsequent acquisition periods (S35). For example, the predetermined number of transmission nodes may be simply updated to the number of the detected transmission nodes (four in the example shown in FIG. 13), or may be updated to a value that is obtained by subtracting a predetermined number from the number of detected transmission nodes, or to a value equivalent to 80% or 70% of the number of detected transmission nodes. That is, the predetermined number of transmission nodes may be updated to a value that is obtained by reducing the number of detected transmission nodes by a predetermined ratio. However, the predetermined number of transmission nodes is updated so that the updated value is equal to or higher than the original "predetermined number of transmission nodes" (i.e., the predetermined number of transmission nodes before the update). Note that the reason why the update value does not necessarily have to be equal to the number of detected transmission nodes is as follows. That is, since the purpose of the radio frame analysis is to infer the configuration of the target network or the like, there is no need to extract the frame feature value while waiting for data transmission from all the transmission nodes including transmission nodes that do not frequently transmit data. By updating the predetermined number of transmission nodes as described above, for example, in the third extraction period in FIG. 13, the counting of the number of transmission nodes is started with the predetermined number N of transmission nodes which has been updated to four (N=4). It is possible, by performing the above-described process for updating the number of transmission nodes, to perform an appropriate analysis according to the actual number of transmission nodes.

Further, as a unique operation performed by the radio frame analysis system 102 according to the third example embodiment, the plurality of reception data acquisition units 11, 12, and 13 acquire received radio-wave strength information (received power information) from reception data sequences received by a plurality of radio-wave sensors corresponding thereto. Then, the reception data acquisition units 11, 12, and 13 send the information about the received radio wave strengths to the transmission node inference unit 35, and the transmission node inference unit 35 estimates (or infers) the position and the transmission power of the transmission node by using the plurality of information pieces about the received radio-wave strengths (the received power) received by the respective radio-wave sensors arranged in a distributed manner.

For example, the transmission node inference unit 35 may estimate (or infer) the transmission power and the transmission position by using a propagation model represented by the below-shown expression (hereinafter referred to as the Expression 5).

$$m_n(\phi)=\alpha\cdot d_n(\phi)^{-\beta}$$

$$d_n(\phi)\sqrt{(x-x_{n1})^2+(y-x_{n2})^2+(z-x_{n3})^2} \qquad \text{[Expression 5]}$$

Figure 14:
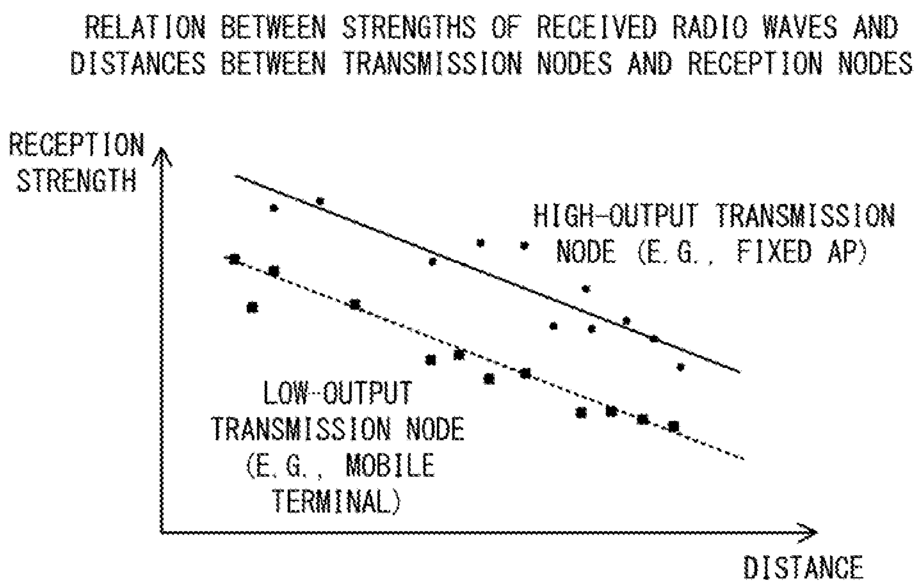
FIG. 14 is a diagram showing an example of a relation between strengths of received radio waves and distances between transmission nodes and reception nodes.

In the Expression 5, $\tilde{m}_n(\varphi)$ is a received radio-wave strength at a radio-wave sensor n. Further, in general, a propagation constant α in the Expression 5 is a parameter related to the transmission output of the radio wave, and β is a parameter related to an attenuation rate at a unit distance. Further, $d_n(\varphi)$ is a distance between the radio-wave sensor n and a transmission node, and φ=(x,y,z) is coordinates of the position of the transmission node. Further, $(x_{n1},x_{n2},x_{n3})$ is coordinates of the position of the radio-wave sensor n. In an environment where the radio-wave sensors are arranged, by receiving a radio wave transmitted from a transmission node whose transmission position and transmission power are known in advance by each of the radio-wave sensors, a graph shown in FIG. 14 can be obtained. FIG. 14 is a graph in which the propagation model represented by the Expression 5 is used as an example, and relations between received radio-wave strengths and distances between the transmission node and the radio-wave sensors when a radio wave transmitted from the known transmission node is received by the radio-wave sensors are plotted. Note that in the example shown in FIG. 14, they are plotted for two types of transmission nodes having different transmission power, i.e., a high-output transmission node (ex.: a fixed AP (Access Point)) and a low-output transmission node (ex.: a mobile terminal). Further, each of the propagation constants (α and β) is obtained by fitting received radio-wave strengths which are measured in advance and distances between the transmission node and the radio-wave sensors into the Expression 5 by using a least squares method, a maximum likelihood estimation method, or the like. Note that it is expected that when the propagation environment is the same, the constant β related to the attenuation rate has the same value and the difference in the transmission power of the transmission node is expressed as the constant α.

Further, in the position estimation process performed by the transmission node inference unit 35, based on the information about the reception strength received at each of the radio-wave sensors, the distance from each of the radio-wave sensors to the transmission node is estimated by using the Expression 5, which includes these propagation constants (α, β), and then the position of the transmission node is estimated. Note that when the transmission power at each transmission node is known, the propagation constant α corresponding to the transmission node having this transmission power is estimated from the value of the propagation constant $\alpha$ of each of the high-output transmission node and the low-output transmission node estimated in advance, and then the position of the transmission node is estimated. On the other hand, when the transmission power in each transmission node is unknown, the transmission position is estimated by using several candidate values as the propagation constant $\alpha$. Then, the estimated position where the reliability (the joint likelihood that distances from the plurality of sensors converge at one point) of the position estimation becomes the highest and the transmission power corresponding to the propagation constant $\alpha$ in that state are output as the position of the transmission node and the estimated transmission power thereof, respectively. Note that for the position estimation and the transmission power estimation performed by the transmission node inference unit 35, in addition to the aforementioned method, a technique in which the propagation constants $\alpha$ and $\beta$ and the transmission position are collectively estimated and updated in real time by using a particle filter or the like may be used.

As described above, in the radio frame analysis system 102 according to the third example embodiment, the transmission node number count unit 21*a* performs counting until data is acquired from a predetermined number of transmission nodes, and the extraction period calculation unit 21*b* calculates the subsequent extraction period (i.e., the length of the subsequent extraction period). In this way, it is possible to extract desired frame feature values (such as the ratio of the amount of transmission data for each transmission node) in the unit time having a necessary and sufficient length (the requisite minimum length with which a desired analysis can be performed). This leads to an advantage that a desired analysis can be performed in a requisite minimum time. Further, it is also possible, by normalizing the extracted frame feature value in the frame feature value extraction unit 31, to extract an absolute difference of the frame feature value caused by a difference of the extraction period that is dynamically set as a relative difference necessary for a desired analysis. That is, the analysis result does not depend on the absolute values of the frame feature values caused by a difference in the extraction period depending on the number of transmission nodes or the like counted until then. The analysis using relative values reflecting only the deviations among the transmission nodes becomes possible. In this way, it is possible to improve the accuracy of the analysis by repeating the extraction of the frame feature value over a plurality of extraction periods.

Further, as another effect of the third example embodiment, it is possible to infer information about the transmission node from a reception data sequence by estimating (or inferring) the transmission position and the transmission power by the transmission node inference unit 35 by using information such as received radio-wave strengths received by a plurality of radio-wave sensors arranged in a distributed manner. As a result, there is an advantage that the transmission node number count unit 21*a* can count the number of transmission nodes even when they are unknown network nodes of which transmission node information cannot be acquired from the frame information (of which information such as a MAC address of Wi-Fi or the like cannot be obtained). Further, by using the information about the transmission position or the transmission power estimated (or inferred) for each transmission node by the transmission node inference unit 35, the analysis unit 41 can also analyze the specifications (whether it is a fixed-AP-type vehicle-mounted station, a portable-type terminal station, or the like) of each transmission node. That is, for example, it can be inferred that a transmission node A having a large amount of transmission data and large transmission power is likely to be a star-type or tree-type control station ($\alpha$ hub station) and likely to be a fixed AP or a vehicle-mounted station having large transmission power. On the other hand, it can be inferred, for example, that a transmission node B having a small amount of transmission data and small transmission power is likely to be a slave station and likely to be a portable terminal station carried by a person.

<Configuration of Computer>

Figure 15:
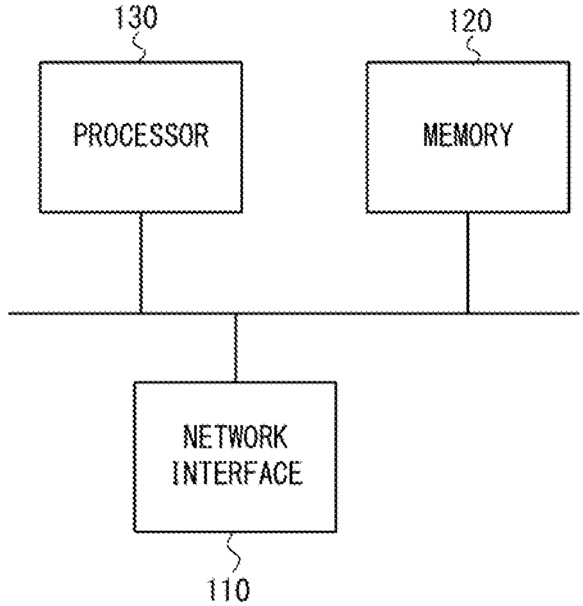
FIG. 15 is a block diagram showing a configuration of a computer of a radio frame analysis system according to each example embodiment.

FIG. 15 is a block diagram showing a configuration of a computer of each of the radio frame analysis systems 100, 101, and 102 according to the above-described example embodiments. As shown in FIG. 15, each of the radio frame analysis systems 100, 101, and 102 includes, for example, a network interface 110, a memory 120, and a processor 130.

The network interface 110 is used to perform communication with an external entity. The network interface 110 may include, for example, a network interface card (NIC).

The memory 120 is formed by, for example, a combination of a volatile memory and a nonvolatile memory. The memory 120 is used to store software ($\alpha$ computer program) including at least one instruction executed by the processor 130 and store data used for various types of processing.

The aforementioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), Compact Disc Read Only Memories (CD-ROM), CD-R, CD-R/W, and semiconductor memories (such as mask ROM, Programmable ROM (PROM), Erasable PROM (EPROM), flash ROM, and Random Access Memory (RAM)). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers, or a wireless communication line.

The processor 130 loads the software (the computer program) from the memory 120 and executes the loaded software, and thereby performs the processing of the radio frame analysis systems 100, 101, and 102 according to the above-described example embodiments. That is, the processing of the radio frame analysis systems 100, 101, and 102 may be implemented by executing the program. Note that part or all of the processing of the radio frame analysis systems 100, 101, and 102 may be implemented by a hardware circuit or the like. The processor 130 may be, for example, a microprocessor, an MPU (Micro Processor Unit), or a CPU (Central Processing Unit). The processor 130 may include a plurality of processors.

Effect of Example Embodiment

As described above, according to the above-described example embodiment, the following effects can be expected.

A first effect is that, in regard to a result of the analysis of the configuration of the target network or the like by the clustering analysis using the frame feature value, it is possible to adaptively reduce the time required to output the result and thus increase the speed of the output of the result without degrading the accuracy of the analysis. The reason for this is that, in the above-described example embodiments, the distance calculation unit calculates a distance between respective clusters, the reliability determination unit determines reliability of the result of the clustering, and the output timing change unit controls an output timing in accordance with the determined reliability. That is, the timing at which the result is output can be advanced only when the reliability of the result of the clustering is high. This leads to the effect that the time required to output the result can be reduced while still maintaining the high accuracy of estimation of the configuration of the target network and the high accuracy of an analysis of the same. That is, there is an advantage that it is possible to adaptively increase the speed of, for example, the estimation of the configuration of the target network using radio frame analysis.

Further, the second example embodiment describes an embodiment in which the minimum number of samples required to output a result is additionally set. In this example embodiment, when the change of the output timing is controlled based on the reliability calculated based on the distance between the clusters, the minimum required number of samples is referred to. Further, if the minimum required number of samples have not been analyzed, it is considered that the reliability of the cluster alone is low and hence the result analysis is not output. By configuring the above-described system, there is an advantage that it is possible to adaptively output at a high speed a more highly reliable result of the analysis in which both the reliability of the cluster alone and the reliability based on the distance of the clusters are taken into account.

The second effect is that it is possible to visualize information, such as the accuracy of a result of the analysis of the configuration of the target network, for a user in real time. The reason for this is that, as described in the second example embodiment, information for supplementing the result of the analysis is output together with the result of the clustering (the result of the analysis of the configuration of the target network). Thus, it is possible to visualize, for an external user, information such as information about the reliability of the result of the clustering (the result of the analysis) and information about whether or not the number of clustered samples has reached the required number of samples of the feature value. Further, as shown in FIG. 10, by outputting detailed information (features such as an average and variance for each cluster, a distance between one cluster and another cluster, reliability for each cluster, and the like) for each cluster, it is also possible to visualize, for an external user, features, reliability, and the like for each individual cluster. By this configuration, there is an advantage that it is possible for an external user (α user) to know, for example, the accuracy of the result of the analysis of the configuration of the target network (e.g., the specifications of each transmission node) with detailed information for each cluster in real time.

The third effect can be obtained by combining with a method for enabling extraction of a frame feature value such as an amount of transmission data in a necessary and sufficient extraction period even when a unit time such as the length of a unit packet of a target network is unknown. As a result of this effect, the network configuration or the like can be efficiently analyzed, and the speed of this analysis processing can be further adaptively increased in a synergistic manner. The reason for this is that, as described in the third example embodiment, the transmission node number count unit performs counting until data is transmitted from a predetermined number of transmission nodes, and the extraction period calculation unit calculates the subsequent extraction period (i.e., the length of the subsequent extraction period). Thus, it is possible to acquire desired frame feature values (such as the ratio of the amount of transmission data for each transmission node) in the unit time having a necessary and sufficient length (the requisite minimum length with which a desired analysis can be performed). This means that even if the frame feature value to be acquired, the length of the unit packet of the target network, the transmitted content, and the like are different, the extraction period (i.e., the length of the extraction period) can be optimized to a necessary and sufficient length according to these factors. By combining this optimized extraction period with a dynamic change of the output timing based on the reliability determined from a distance between clusters mentioned in the description of the first effect, there is an advantage that the speed can be further adaptively increased in a synergistic manner.

Further, as a secondary effect, there is an advantage that, by combining with the transmission power estimation using reception strength information in the transmission node inference unit, it is possible to analyze the configuration of the target network while including the inference of the type (such as a vehicle-mounted type and a portable type) of each transmission node in the analysis. The reason for this is as follows. As described in the third example embodiment, the transmission position and the transmission power are estimated (or inferred) by the transmission node estimation unit by using information about received radio-wave strengths or the like received by a plurality of radio-wave sensors arranged in a distributed manner. Further, by using transmission node information (the transmission position and the transmission power) estimated (or inferred) by the transmission node inference unit, the analysis unit can also analyze the specifications (whether it is a fixed-AP-type vehicle-mounted station, a portable-type terminal station, or the like) of each transmission node from the result of the clustering.

The present disclosure is not limited to the above-described example embodiments, and they may be modified as appropriate without departing from the spirit and scope of the disclosure.

According to the present disclosure, it is possible to provide a radio frame analysis system, a radio frame analysis method, and a program that are capable of outputting, when a frame feature value is extracted and analyzed, a result of the analysis in an appropriate time in accordance with an object to be analyzed.

The first to third example embodiments can be combined as desirable by one of ordinary skill in the art. While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

What is claimed is:

1. A radio frame analysis system comprising:

at least one memory storing program instructions; and at least one processor configured to execute the instructions to: analyze a network configuration by performing clustering processing on a frame feature value;

calculate a distance between clusters obtained by the clustering processing;

determine reliability of a result of the clustering processing based on the distance between the clusters;

output a result of the analysis; and change a timing at which the result of the analysis is output by changing the number of samples of the frame feature value required to output the result in accordance with the reliability.

2. The radio frame analysis system according to claim 1, wherein the processor is further configured to execute the instructions to:

perform the clustering processing each time a predetermined number of samples of the frame feature value are obtained, and when the reliability is less than a predetermined threshold, perform control so that the result of the analysis is output at the time when the clustering processing is performed on the frame feature value for a preset first number of samples, while when the reliability is equal to or greater than the predetermined threshold, perform control so that the result of the analysis is immediately output regardless of whether or not the number of samples of the frame feature value to be subjected to the clustering processing has reached the first number.

3. The radio frame analysis system according to claim 2, wherein the processor is further configured to execute the instructions to, when the reliability is equal to or greater than the predetermined threshold, perform control so that the result of the analysis is not output when the number of samples of the frame feature value to be subjected to the clustering processing has not reached a preset second number, and the second number is a number smaller than the first number.

4. The radio frame analysis system according to claim 1, wherein the processor is further configured to execute the instructions to calculate the distance between the clusters by using a Mahalanobis distance or a normalized Euclidean distance.

5. The radio frame analysis system according to claim 1, wherein the processor is further configured to execute the instructions to output information about the reliability or the distance between the clusters together with the result of the analysis.

6. The radio frame analysis system according to claim 1, the processor is further configured to execute the instructions to:

count the number of transmission nodes in a reception data sequence;

calculate an extraction period based on a result of the counting; and extract the frame feature value from the reception data sequence received in the extraction period.

7. The radio frame analysis system according to claim 1, the processor is further configured to execute the instructions to, by using a plurality of reception sensors, estimate transmission power or a transmission position of each of the transmission nodes from information about reception strengths of the reception data sequences acquired by the plurality of reception sensors, respectively.

8. The radio frame analysis system according to claim 7, wherein the processor is further configured to execute the instructions to perform an analysis by using information about the transmission power or the transmission position estimated for each of the transmission nodes.

9. A radio frame analysis method comprising:

analyzing a network configuration by performing clustering processing on a frame feature value;

calculating a distance between clusters obtained by the clustering processing;

determining reliability of a result of the clustering processing based on the distance between the clusters; and changing a timing at which the result of the analysis is output by changing the number of samples of the frame feature value required to output the result in accordance with the reliability.

10. A non-transitory computer readable medium storing a program for causing a computer to execute:

an analysis step of analyzing a network configuration by performing clustering processing on a frame feature value;

a distance calculation step of calculating a distance between clusters obtained by the clustering processing;

a reliability determination step of determining reliability of a result of the clustering processing based on the distance between the clusters;

an output step of outputting a result of the analysis; and an output timing change step of changing a timing at which the result of the analysis is output by changing the number of samples of the frame feature value required to output the result in accordance with the reliability.

* * * * *